US009230200B2

(12) United States Patent
Deng et al.

(10) Patent No.: US 9,230,200 B2
(45) Date of Patent: Jan. 5, 2016

(54) METHOD OF PROCESSING GRAPHICS WITH LIMITED MEMORY

(71) Applicant: CANON KABUSHIKI KAISHA, Tokyo (JP)

(72) Inventors: Dixon De Sheng Deng, East Ryde (AU); Joseph Leigh Belbin, Mount Colah (AU)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/444,178

(22) Filed: Jul. 28, 2014

(65) Prior Publication Data

US 2015/0036160 A1    Feb. 5, 2015

(30) Foreign Application Priority Data

Jul. 30, 2013   (AU) ................................ 2013211451

(51) Int. Cl.
  *G06T 15/40*   (2011.01)
  *G06K 15/02*   (2006.01)
(52) U.S. Cl.
  CPC ........ *G06K 15/1861* (2013.01); *G06K 15/1849* (2013.01); *G06K 15/1865* (2013.01)
(58) Field of Classification Search
  None
  See application file for complete search history.

(56) References Cited

U.S. PATENT DOCUMENTS

| | | | |
|---|---|---|---|
| 5,748,862 A * | 5/1998 | Ohno et al. | 358/1.16 |
| 5,850,504 A | 12/1998 | Cooper et al. | |
| 6,466,210 B1 | 10/2002 | Carlsen et al. | |
| 7,084,878 B2 | 8/2006 | Herceg et al. | |
| 2003/0200507 A1* | 10/2003 | Stern et al. | 715/517 |
| 2009/0214231 A1* | 8/2009 | Nagai | 399/27 |
| 2009/0244590 A1* | 10/2009 | Yokoyama | 358/1.14 |
| 2011/0194142 A1* | 8/2011 | Wakana | 358/1.15 |
| 2012/0139918 A1* | 6/2012 | Michail et al. | 345/421 |
| 2013/0155475 A1* | 6/2013 | Chen et al. | 358/531 |

FOREIGN PATENT DOCUMENTS

AU    2008202366 A1    12/2009

* cited by examiner

*Primary Examiner* — Benny Q Tieu
*Assistant Examiner* — Haris Sabah
(74) *Attorney, Agent, or Firm* — Canon USA, Inc. IP Division

(57) ABSTRACT

A method for combining layers of an image represented using an intermediate format receives at least two layers from the plurality of layers to be combined and estimates resources required to combine the received layers using a first combining operation. The first combining operation comprises at least rasterizing data of the received layers. The method attempts to combine the received layers using a second combining operation to produce an output in the intermediate format. In response, the method generates a combined layer for the image by combining the received layers in accordance with a selected one of the first combining operation (merge & flatten) and the second combining operation (merge). The selected combining operation is based on success of the attempt. Desirably the method is performed within a printer apparatus where limited memory and/or computing resources are available for image rendering which could otherwise limit the rendering of complex pages.

21 Claims, 25 Drawing Sheets

METHOD OF PROCESSING GRAPHICS WITH LIMITED MEMORY

CROSS-REFERENCE TO RELATED APPLICATION(S)

This application claims the benefit under 35 U.S.C. §119 of the filing date of Australian Patent Application No. 2013211451, filed Jul. 30, 2013, hereby incorporated by reference in its entirety as if fully set forth herein.

TECHNICAL FIELD

The present invention relates to processing graphics, such as print data, in a system with limited memory.

BACKGROUND

A computer application being executed by a computing device typically provides a page to a device for printing and/or display in the form of a description of the page, with the description provided to device driver software of the device in a page description language (PDL), such as Adobe® PDF or Hewlett-Packard® PCL. The PDL provides descriptions of objects to be rendered onto the page, as opposed to a raster image of the page to be reproduced, for example by printing onto a hard copy medium such as paper, or display upon a video display device. Equivalently, a set of descriptions of graphic objects may be provided in function calls to a graphics interface, such as the Graphical Device Interface (GDI) in the Microsoft Windows™ operating system, or X-11 in the Unix™ operating system, as used in many computing devices. The page is typically rendered for printing and/or display by an object-based graphics system, also known as a Raster Image Processor (RIP).

A PDL-based printer must be able to reliably handle PDL input of high complexity. However it is not always possible to interpret highly complex PDL input in its entirety prior to pixel generation in view of the typically limited memory and processor resources available in a printer system. Consequently, several methods have been utilized to enable PDL printers to process highly complex input PDL jobs prior to final pixel generation.

One of such method involves dividing a complex PDL input into batches of foreground objects which are scan-converted and composited onto a background bitmap. The resultant bitmap may be compressed and be used as the background bitmap for subsequent foreground object batches. The increased processing of compressed bitmaps will impact on the overall performance as each bitmap has to be decompressed before compositing. Furthermore, compression artefacts are also likely to be introduced to the compositing operation, and this will consequently degrade the quality of the final output. Even if a lossless compression technique is used, this method will require a large amount of memory to store the background bitmap. Other similar methods divide the page into strips and batch objects according to these strips, but they suffer the same disadvantages.

Other methods convert a batch of consecutive PDL input objects to an intermediate representation, such as a fillmap. FIG. 1 is a schematic flow diagram that demonstrates the top-level processing of this method. The batch fillmaps are merged into a merged fillmap to reduce memory usage. Due to the lossless and compact nature of fillmaps, the merged fillmap will often lead to a good saving of system resources while preserving the original quality of the PDL data. Thus, this method overcomes performance and quality degradation that is seen in other bitmap based approaches. Although this method works well for many common test cases, resources may still run out during the merging process for some unusual cases. For example, when the number of unique fill compositing sequences generated from overlapping translucent objects in a PDL input exceeds a predetermined threshold associated with available printer system resources, the merging process will run out of resources (typically memory resources) for keeping (storing) the fill compositing sequence after merging. Without a means of recovery, this drawback is catastrophic in a system such as a printer, especially considering that printers do not usually have many system resources available. When resources are exhausted, the printer will have no choice but to halt the printing of the PDL data and possibly leave the user with a printed page with incorrect output.

The disadvantages of such methods include high computational complexity, high memory storage requirements, degraded output quality and a potential out-of-resources condition in unusual cases. Consequently, what is needed is a method for processing input objects using limited resources with efficiency while maximising the quality of the generated pixel output.

SUMMARY

According to one aspect of the present disclosure there is provided a method for combining layers of an image, the image comprising a plurality of layers represented using an intermediate format, the method comprising:
receiving at least two layers from the plurality of layers to be combined;
estimating resources required to combine the received layers using a first combining operation, wherein the first combining operation comprises at least rasterising data of the received layers;
based on the estimated resources for the first combining operation, attempting to combine the received layers using a second combining operation to produce an output in the intermediate format; and
in response to the attempting, generating a combined layer for the image by combining the received layers in accordance with a selected one of the first combining operation and the second combining operation, wherein the selected combining operation is based on success of the attempt.

Desirably the first combining operation comprises merging and flattening at least two of the received layers and/or the second combining operation comprises merging at least two of the received layers.

Preferably, the intermediate format comprises a fillmap.

Desirably the estimating is based upon a structure of the intermediate format and a content of at least one of the received layers in the intermediate format, particularly where the content includes attributes of the layers selected including number of edges and fill type.

Generally the estimating is dependent on resources required to produce and store at least a partially rasterised output of the first combining operation.

The method may further comprise combining the layers in accordance with the second combining operation, when the estimation of resources required to perform first combining operation is above a predetermined threshold.

In a specific implementation, the method comprises determining, using the estimate, a display list associated with the received layers, and selecting portions of the image associated with determined display list to be merged. Desirably the generating further comprises generating a combined layer for the selected portions by combining data from the received layers corresponding to the selected portions in accordance with the second combining operations if the attempt succeeds, and in accordance with the first combining operation otherwise.

According to another aspect, disclosed is a method for combining layers of an image, the image comprising a plurality of layers represented using an intermediate format, said method comprising:

(a) receiving two layers from the plurality of layers to be combined;

(b) estimating resources required to combine the received layers using a first combining operation, wherein the first combining operation comprises at least rasterising data of the received layers;

(c) where the estimated resources are sufficient for the first combining operation, attempting to combine the received layers using a second combining operation to produce an output in the intermediate format;

(d) where the attempt is successful, using the output as the result of the method, and (e) where the attempt is unsuccessful, generating a combined layer for the image by combining the received layers in accordance with the first combining operation.

Here, preferably the two layers are adjacent layers in z-order of the image and are combined to form a combined layer, and the method further comprises repeating steps (a) to (e) using the combined layer as one of the two received layers until all layers of the image have been rasterised.

According to another aspect, disclosed is a non-transitory computer readable storage media having a program recorded thereon, the program being executable by a processor to combine layers of an image, the image comprising a plurality of layers represented using an intermediate format, said program comprising:

code for receiving at least two layers from the plurality of layers to be combined;

code for estimating resources required to combine the received layers using a first combining operation, wherein the first combining operation comprises at least rasterising data of the received layers;

based on the estimated resources for the first combining operation, attempting to combine the received layers using a second combining operation to produce an output in the intermediate format; and code for generating, in response to the attempting, a combined layer for the image by combining the received layers in accordance with a selected one of the first combining operation and the second combining operation, wherein the selected combining operation is based on success of the attempt.

According to a further aspect, disclosed is an apparatus for combining layers of an image, the image comprising a plurality of layers represented using an intermediate format, the apparatus comprising:

a receiver to receive at least two layers from the plurality of layers to be combined;

a resource estimator to estimate resources required to combine the received layers using a first combining operation, wherein the first combining operation comprises at least rasterising data of the received layers;

a combining operation selector to select one of the first combining operation and the second combining operation based on success of an attempt to combine the received layers using a second combining operation to produce an output in the intermediate format, the selector being triggered in response to the estimation of resources required to combine the received layers using a first combining operation; and a combined layer generator to combine the received layers of the image in accordance with the selected combining operation by the selector.

Also disclosed is an image printing system comprising:

computer apparatus operable to create a page to be printed; and printer apparatus coupled to the computer apparatus, the printer apparatus comprising the apparatus according to the above aspect in which the resources comprise at least memory resources of the printer apparatus available for rendering the intermediate format to a hard copy medium.

According to another aspect of this disclosure, there is provided a method for combining layers of image data, the image data comprising a plurality of layers represented using an intermediate format, said method comprising:

receiving a plurality of layers until resources associated with combining the received layers using a first combining operation exceed a predetermined threshold, wherein the first combining operation at least rasterises data of the received layers;

in response to exceeding the predetermined threshold, combining the received layers using a second combining operation to produce an output in the intermediate format; and where the combining using the second combining operation is unsuccessful, generating a rasterised output for the image data by combining the received layers in accordance with the first combining operation.

For this method, in a desirable implementation, the first combining operation rasterises a portion of the received layers before merging at least one other portion of the received layers and the resources associated with the first combining operation comprise memory for storing the rasterised output of the first combining operation.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
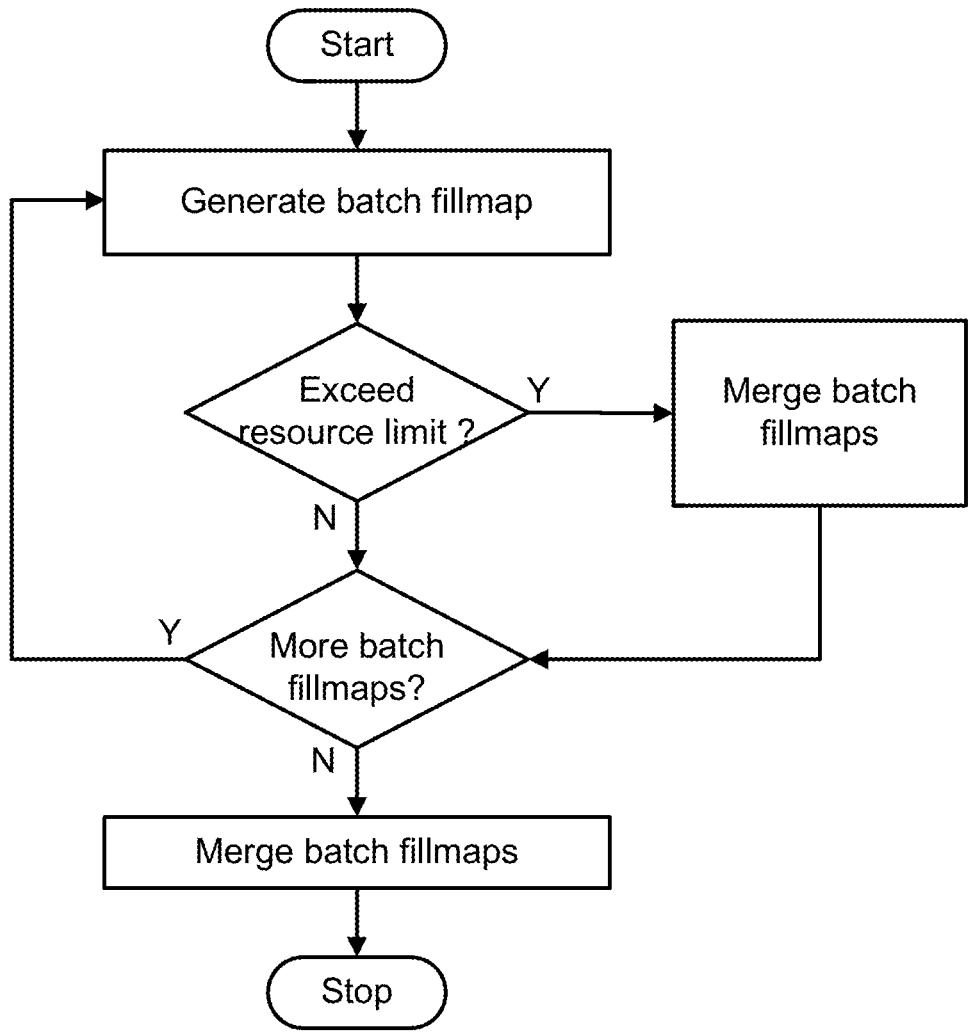
FIG. 1 is a schematic flow diagram of a prior art method.
Figure 2:
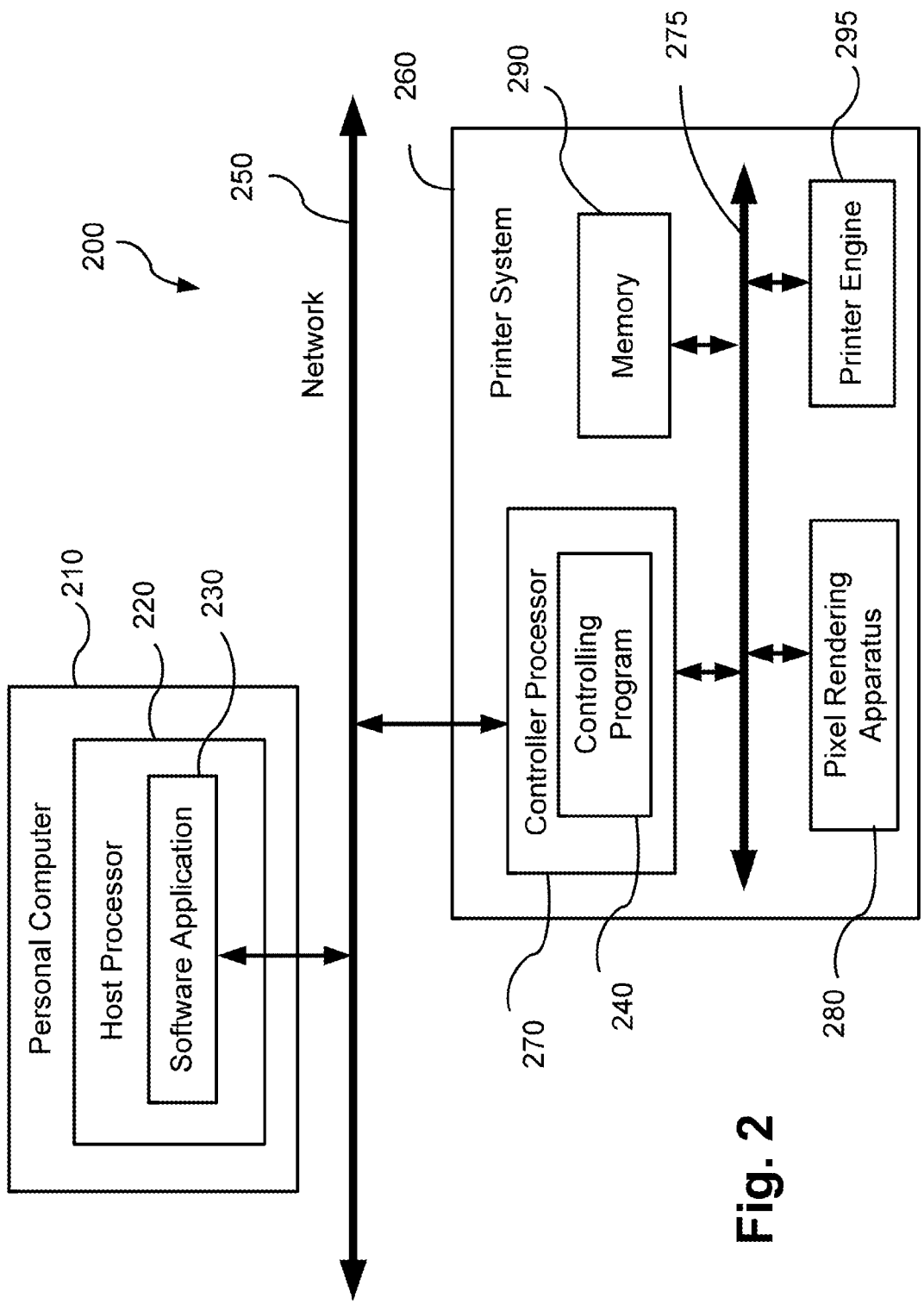
FIG. 2 is a schematic block diagram of a data processing architecture within which the arrangements described may be practised.

FIG. 2 shows a schematic block diagram of a pixel rendering system 200 for rendering computer graphic object images which may be processed by the disclosed method for fillmap processing. The pixel rendering system 200 comprises a personal computer 210, representing an exemplary computing device, connected to a printer system 260 through a network 250. The network 250 may be a typical network involving multiple computing devices, including tablet devices, PDAs and the like, or may be a simple connection between a single computing device and the printer system 260. The network 250 may be wired or wireless, and may include routers or other interconnections between wired or wireless sub-networks.

The personal computer 210 comprises a host processor 220 for executing a software application 230, such as a word processor or graphical software application.

The printer system 260 comprises a controller processor 270 for executing a controlling program 240, a pixel rendering apparatus 280, memory 290, and a printer engine 295, each coupled via a bus 275. The pixel rendering apparatus 280 operates to rasterise image data to form pixel data, and is preferably provided in the form of an application specific integrated circuit (ASIC) coupled via the bus 275 to the controller processor 270, and the printer engine 295. However, the pixel rendering apparatus 280 may also be implemented in software, for example stored in the memory 290 and executed in the controller processor 270 or another embedded processor (not shown). The controller processor 270 has usually formed therein a limited cache memory (not illustrated), or simply "cache", which is used to mirror the storage of select data created during print processing and which is ordinarily stored in "main" memory, formed within the memory 290.

The controlling program 240 is typically stored in the memory 290, which is also used for temporary storage of print data during the processing performed within the printer system 260. Typically the memory 290 is formed by a combination of memory types including read-only memory (ROM), non-volatile random-access memory (RAM) and volatile RAM. Quite often the controlling program 240 is stored in ROM and cannot be altered after manufacture, without replacement of the ROM. Where the controlling program 240 is stored in non-volatile RAM, such affords the possibility of upgrades or changes to the controlling program 240 from time to time, provided sufficient memory capacity is available. In some instances the non-volatile RAM may be formed by magnetic disk drive or similar storage device. As such the memory 290 includes or is formed by non-transitory tangible computer readable storage media within which the controlling program 240, at least, may be stored. The controlling program 240 may be supplied to the printer system 260 for such storage via portable non-transitory tangible computer readable storage media (e.g. USB memory or CD-ROM) connectable to the printer system 260, or via transitory non-tangible computer readable transmission media, including for example the network 250.

In the pixel rendering system 200, the software application 230 creates page-based documents where each page contains objects such as text, lines, fill regions, and image data. The software application 230 sends a high-level description of the page (for example a PDL file) via the network 250 to the controlling program 240 that executes in the controller processor 270 of the printer system 260.

The controlling program 240 receives the description of the page from the software application 230, and decomposes the graphical objects into component primitives, including edges, levels and fills. These edges, levels and fills are called the first set of primitives. Other attributes include the number of edges and the fill type. The fill may be a flat fill representing a single colour, a blend representing a linearly varying colour, a bitmap image or a tiled (i.e. repeated) image.

The controlling program 240 then further processes this first set of primitives to generate a fillmap and a table of known fill compositing sequences. This fillmap and table of known fill compositing sequences are called the second set of primitives. Generally, throughout this specification and accompanying claims, the expression "fillmap" can be understood as referring to a pixel resolution representation of a set of components of a graphical object derived from a page description. However, with specific regard to the preferred implementations to be described, the fillmap is a pixel-resolution representation of the first set of primitives, in the sense that every pixel location within the fillmap corresponds to a pixel location within the raster image describing a page, and vice versa. In contrast to the raster image representation of a page, each pixel location within the fillmap contains a reference to the fill from which the colour and attribute data are derived for the corresponding pixel location. In a preferred implementation, a fillmap comprises regions defined pixel-aligned edges. Each pixel-aligned edge is associated with a fill compositing sequence that describes graphical appearance of the region corresponding to the edge.

A fill may be a fill compositing sequence of Z-ordered levels, where each level contains attributes such as a fill, together with the opacity of the level, a blending operator or a raster operator (ROP) which determines how to mix the colour and attribute data of this level with other overlapping levels, and the priority, or Z-order, of the level. A fill compositing sequence refers to information about all the graphic objects which contribute to the colour and attribute data at specified pixel locations.

Multiple pixel locations within the fillmap may contain a reference to the same fill. Preferably, an entire region of connected pixels with the same fill has a single representative reference to fill.

The controlling program 240, executed on the controller processor 270, is also responsible for allocating memory capacity within the memory 290 for the pixel rendering apparatus 280, initialising the pixel rendering apparatus 280, and instructing the pixel rendering apparatus 280 to start rendering the second set of primitives.

The pixel rendering apparatus 280 then uses the second set of primitives to render the page to pixels. The output of the pixel rendering apparatus 280 is colour pixel data, which may be used by the printer engine 295 to reproduce the pixel data upon a hard copy medium such as paper.

Figure 3A:
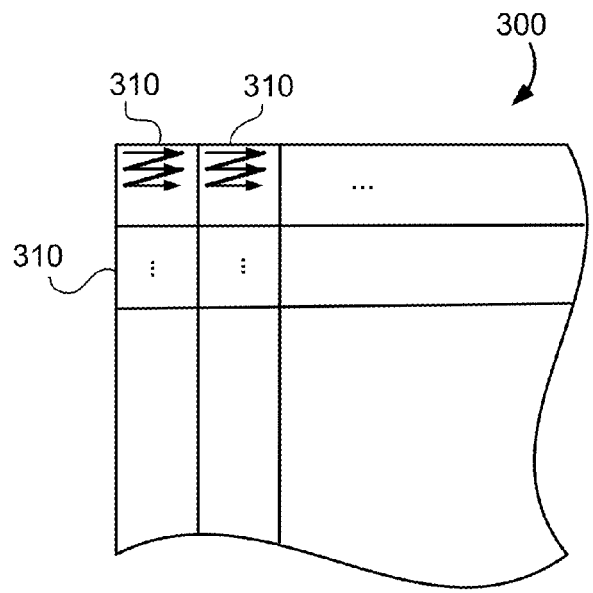
FIG. 3A is a schematic representation showing an example page divided into tiles.
Figure 3B:
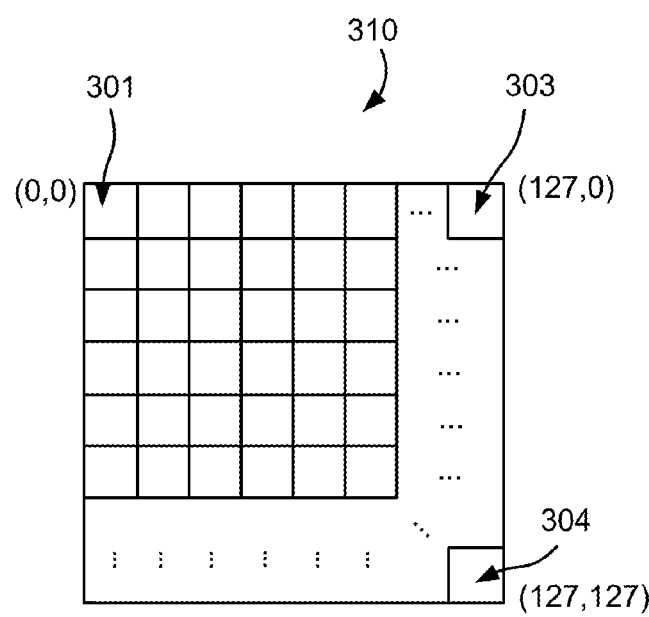
FIG. 3B is a schematic representation of a tile.

The methods according to preferred arrangements manage fillmap data in tiles. For the purposes of this disclosure a tile refers to a block of N by M pixels, where there are multiple blocks across the width of the page and multiple blocks down the length of the page. Tiles are disjoint and cover the page. FIG. 3A demonstrates an example of a page 300 divided into tiles 310, only three of which being labelled as such. The dimensions of a tile 310 is preferably an integer multiple of 8. For example for an A4 page at a printer resolution of 600 dpi, a suitable choice for tile dimensions is M=N=128, which often leads to a balanced trade-off between cache and compression performance (a tile is often compressed to save memory storage, in both the cache and the main memory). The location of a pixel (X, Y) within a tile, where X, Y are integers, is relative to the upper left hand corner of the tile. Y indexes the tile rows whereas X indexes the offset of a pixel along a tile row. A tile row consists of the set of pixels that span the width of the tile 310. Referring now to FIG. 3B, for an exemplary tile 310, for example, the first pixel 301 in the first tile row occupies pixel location (0, 0), whereas the last pixel 303 in first tile row occupies pixel location (127, 0). Accordingly, the last pixel in the last tile row occupies location (127, 127) 304. Raster tile order refers to processing a tile pixel by pixel tile row by tile row, in sequential order, starting with the first tile row and ending with the last row. Pixel values P(X, Y) within a tile refer to the colour value of a pixel P, located at a location (X, Y). Where the dimensions of a page do not contain an integer number of tiles the page is preferably padded to the requisite size. Typically tiles 310 are processed sequentially one by one, though select numbers of tiles 310 may also be processed in parallel.

Figure 4:
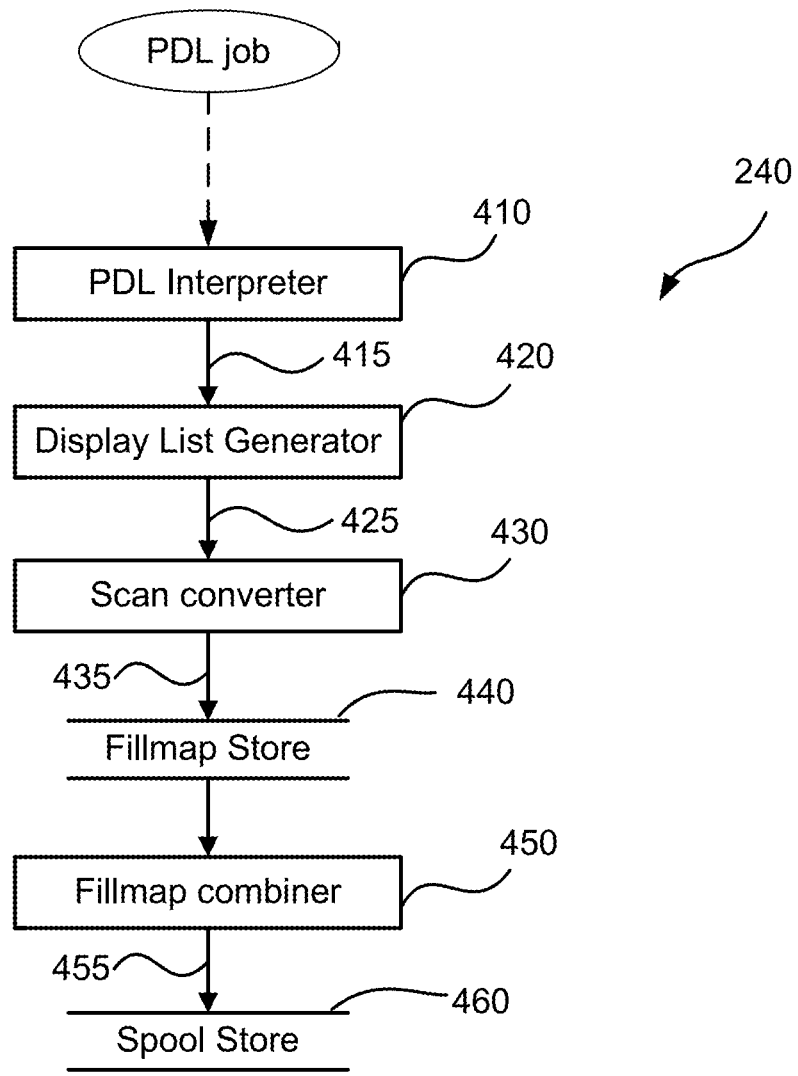
FIG. 4 is a schematic flow diagram illustrating PDL reproduction data flow including a fillmap combiner according to the present disclosure.

Referring to FIG. 4, the controlling program 240 executed on processor 270 receives a (complex) PDL job via the network 250. The program 240 is illustrated as being formed by a number of software or program code modules including a PDL interpreter 410, a display list generator 420, a scan converter and a fillmap combiner 450. The PDL interpreter 410, executed as part of controlling program 240, processes the PDL job into graphics primitives 415 for each page to be rendered, which are passed to the display list generator 420. Here, the graphics primitives 415 are divided into batches by display list generator 420 before being decomposed into edges, levels and fills (the first set of primitives 425) and passed to the scan converter 430. The scan converter 430 executes as part of the controlling program 240 on processor 270 to create a fillmap for each batch of edges, levels and fills, which is known as "batch fillmap" 435. Each batch fillmap may be considered an intermediate format of at least a part of the page to be rendered, and may also include additional information such as a total number of edges and fill types. The batch fillmaps 435 are then passed via bus 275 to be stored in a fillmap store 440 which is formed as part of the memory 290. In a preferred implementation, when all batch fillmaps 435 associated with a page to be rendered are stored in the fillmap store 440, the fillmap combiner 450 fetches the batch fillmaps 435 from the fillmap store 440 via bus 275 and combines the fetched batch fillmaps into either a merged fillmap or a bitmap contained in a fillmap. The detail of the combination process will be discussed in detail later in this disclosure. Merging all batch fillmaps 435 associated with a page ensures obscured objects are not processed during rendering. A resultant fillmap 455 produced by fillmap combiner 450 is sent via bus 275 to memory 290 to be stored in a spool store 460, ready for rendering by the pixel rendering apparatus 280.

In an alternative implementation, the controlling program 240 may execute the fillmap combiner 450 when there is a plurality of batch fillmaps in fillmap store 440. When the fillmap combiner 450 is executed before all batch fillmaps associated with a page to be rendered are stored, the merged result will be stored back into the fillmap store 440 as a batch fillmap, replacing the merged batch fillmaps. Such an alternative implementation will use less memory 290 to store batch fillmaps at the expense of potentially merging graphic objects that will be obscured by another batch fillmap with higher Z-order.

It should be appreciated that elements discussed with respect to FIGS. 2 and 4, particularly those of the controlling program 240 and the pixel rendering apparatus 280, can be implemented as either software-based code elements, or as hardware components, embedded or otherwise, for example using application specific integrated circuits (ASICs), filed programmable gate arrays (FPGAs) and the like.

Batch Fillmaps

Figure 5:
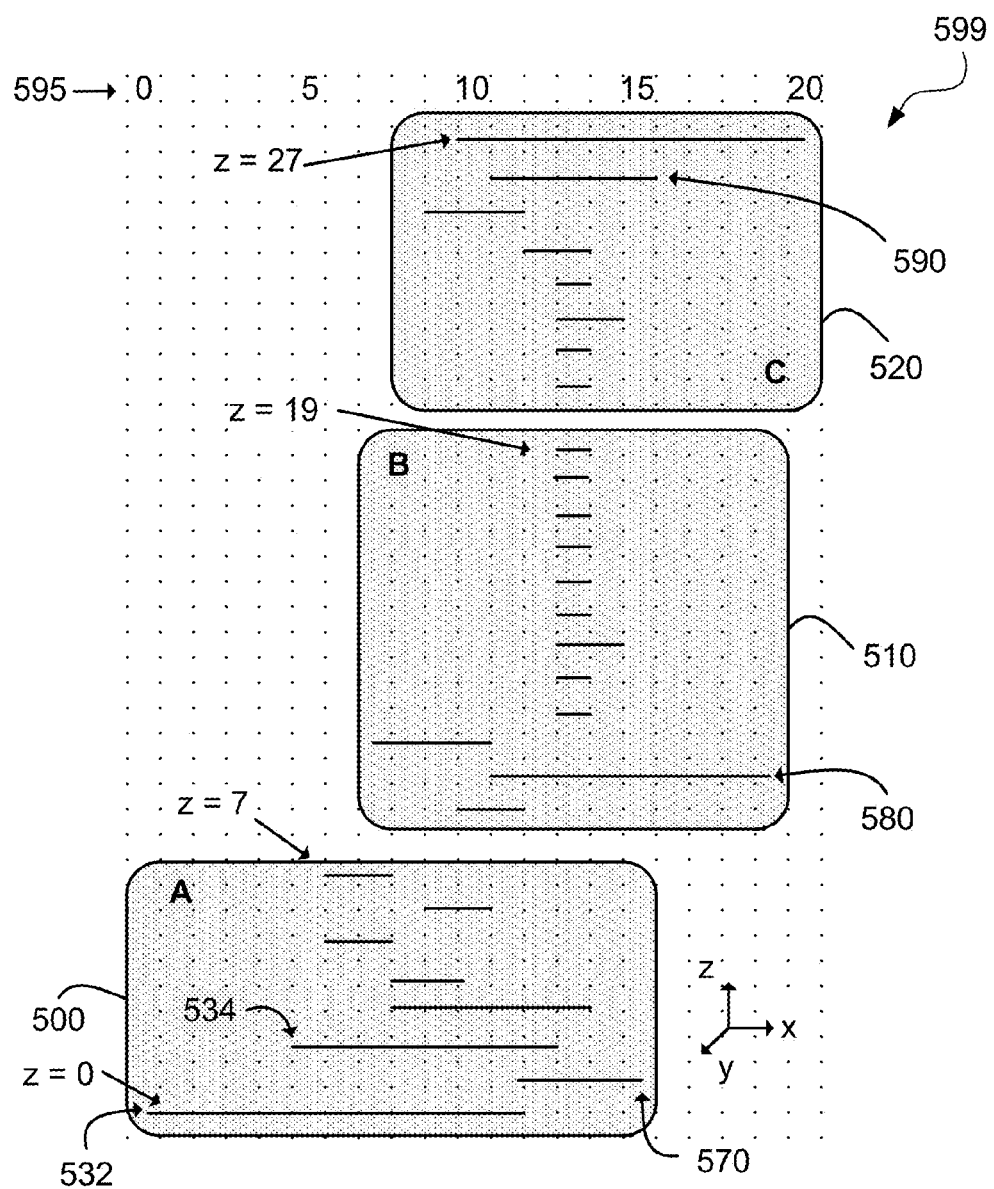
FIG. 5 is a representation of an example page display list.

FIG. 5 is a representation of an example display list 599 to be printed. In this figure, each solid horizontal line represents the projection of a display list object onto the x-axis, where the x-y plane defines the area of the page to be output.

As shown, there are a total of 28 objects in the display list 599, with object priority, or z-levels, ranging from z=0 to z=27. Where two objects overlap in the x-y plane, the object with the lower z-level is drawn beneath the object with the higher z-level. In FIG. 5, the object with projection 532 is the bottom-most object in the display list 599, and here has object priority z=0. The object with projection 534 has object priority z=2.

The 28 objects of the display list 599 are divided into three batches 500, 510, and 520. Display list batch 500 contains objects with z-levels 0 through 7 inclusive. Display list batch 510 contains objects with z-levels 8 through 19 inclusive, and batch 520 contains objects with z-levels 20 through 27 inclusive.

As well as indicating the "banding" of display list objects by z-order, the regions corresponding to batches 500, 510 and 520 show the x-axis projection of the fillmap produced from each batch. From FIG. 5, display list batch 500 is used to generate fillmap A, batch 510 is used to generate fillmap B, and batch 520 is used to produce a third fillmap, fillmap C Each batch fillmap may be considered a layer of image to be rendered.

The indices 0, 5, 10, 15, and 20 shown at the right of label 595 in FIG. 5 define the tile number, in the x-direction, for the zero-indexed grid of tiles for the page to be printed. The shaded regions A, B and C for display list batches 500, 510 and 520, respectively, show that each generated fillmap has an x-dimension equal to an integral number of tiles. Fillmap A is precisely 16 tiles wide, while fillmaps B and C are exactly 13 tiles wide. Note that the dimensions of batch fillmaps are typically equal to the size of the bounding box for constituent display list objects (at output resolution), rounded out to the nearest tile boundary.

Figure 6:
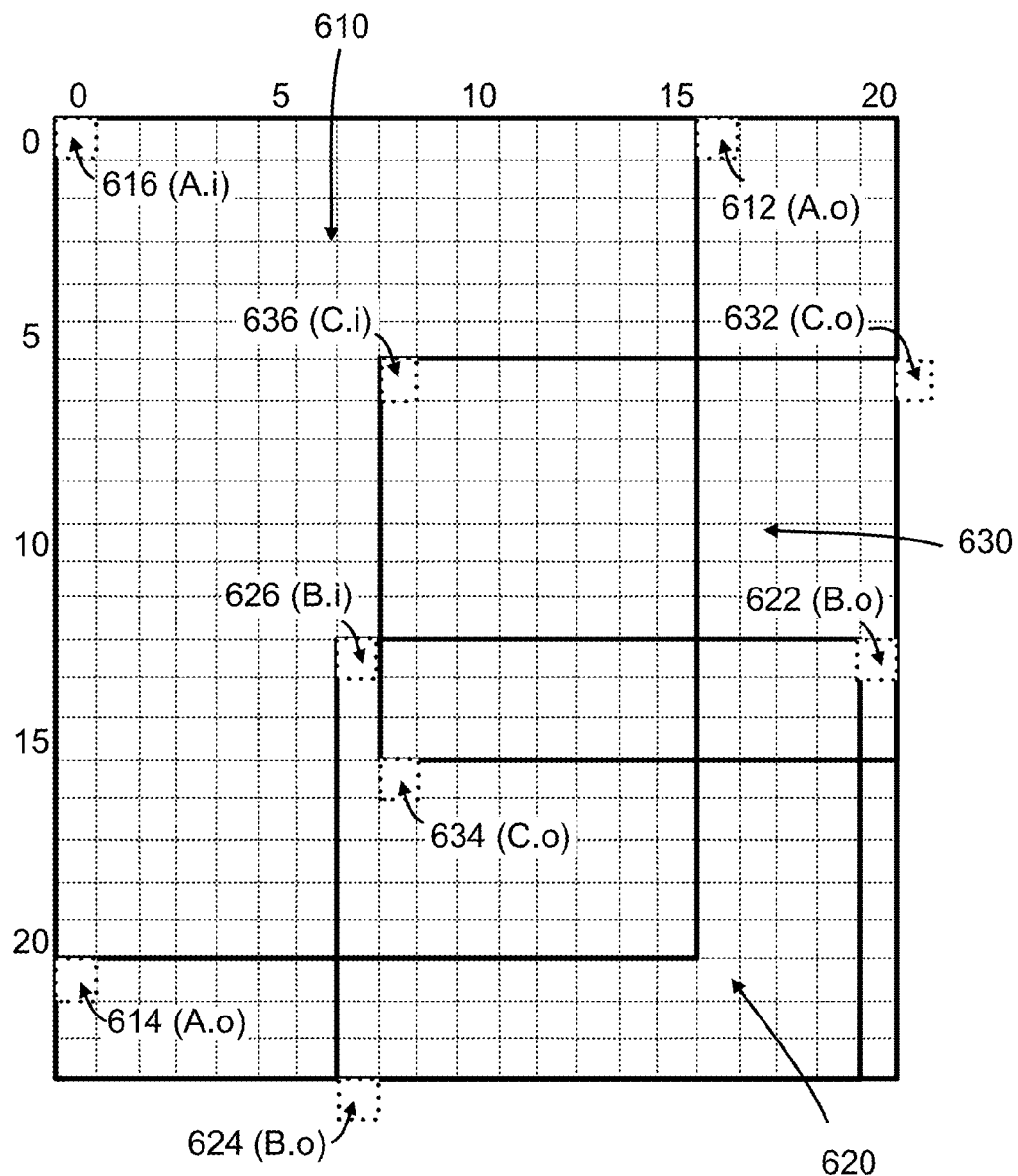
FIG. 6 shows the arrangement of batch fillmaps from the example of FIG. 5.

The size and location in the x-y plane of batch fillmaps generated from the example given in FIG. 5 is illustrated in FIG. 6. As shown, the minimally-sized resultant fillmap for the page to be rendered comprises 21 tiles numbered 0 to 20 in the x-direction and 24 tiles numbered 0 to 23 in the y-direction. Batch fillmap A 610 with fillmap priority 7 occupies tiles 0, 15 in the x-direction and tile range 0, 20 in the y-direction. Batch fillmap B 620 with fillmap priority 19 occupies tile range 7, 19 in the x-direction and tile range 13, 23 in the y-direction. Finally, batch fillmap C 630 with fillmap priority 27 occupies tile range 8, 20 in the x-direction and tile range 6, 15 in the y-direction.

Batch Fillmaps Combination Process

As batch fillmaps accumulate in number, there may exist a time during PDL processing where the fillmap storage approaches, or even exceeds, a memory limit allocated or even available in the memory 290. When this happens, the batch fillmaps will need to be compacted to free-up memory for further PDL objects to be processed. This process is referred to as "combination". The combination process is achieved by combining multiple batch fillmaps into a single batch fillmap. Typically all batch fillmaps are merged into a single batch fillmap.

One such combination process is known as "fillmap merging". The fillmap merging process works out a set of merge regions from the batch fillmaps. A merge region is a set of tiles in the output fillmap which will contain merged tile data from a set of batch fillmaps. Regions in the new fillmap that have no contribution from any of the batch fillmaps are known as empty regions. Each merge region is treated in turn. For each tile in the merge region, the corresponding tiles are retrieved from the related batch fillmaps. The edges in these tiles are combined together, in increasing z order, to create a new tile that is then inserted into the output fillmap. As the edges are merged together, new regions are created. Each region will require an updated fill compositing sequence that represents the new region content. The creation of this new fill compositing sequence simply involves concatenating the fill compositing sequences from the original regions in the original z ordering. Once all merge regions have been processed, the original batch fillmaps can be discarded. All references to fills and fill compositing sequences that are no longer required can also be deleted.

The fillmap merging process has an advantage of preserving the same quality of the original batch fillmaps while reducing the memory usage in most cases. Although this method works well in the majority of cases, resources may still run out during the merging process for some unusual cases. This is largely due to the unbounded nature of the memory required to store the resultant merged fillmap. As stated previously, this drawback is catastrophic in a system with limited memory, such as a printer.

Presently disclosed is an alternative method of the combination process, referred to herein as "fillmap merge-and-flatten". Similar to fillmap merging, the fillmap merge-and-flatten process merges the edges and fill compositing sequences from the contributing batch fillmaps on a per tile basis for each merge region. However, instead of creating new tiles with merged edges and fill compositing sequences, the fillmap merge-and-flatten process converts, or flattens, the batch fillmaps into a pixel representation. The output of the fillmap merge-and-flatten process is a single bitmap contained in a fillmap structure. In a preferred implementation, the resultant bitmap is compressed to reduce memory storage. The fillmap merge-and-flatten process has the advantage of deterministic memory usage. This makes it possible to estimate beforehand the exact memory usage of fillmap merge-and-flatten that guarantees success of the process. However, the fillmap merge-and-flatten process will likely impact on the overall performance in the common or typical printing cases, as extra processing (such as compressing, decompressing and rendering) is needed to process the increased number of bitmaps. This is even more apparent if the resultant is compressed, as is required to be decompressed before rendering. Moreover, if the resultant bitmap is lossily compressed, this may also degrade the final output quality.

Also disclosed is a method that utilises both the fillmap merging process and the fillmap merge-and-flatten process. With this method, in most common cases, fillmap merging is performed to combine the batch fillmaps into a merged fillmap with success, and the output quality is maximised as fillmap merging preserves the original quality of the PDL data. Only when fillmap merging fails or is otherwise unsuccessful due to unusual cases, is the fillmap merge-and-flatten process is performed to guarantee the success of the combination process.

The fillmap merge-and-flatten process has the advantage of a deterministic memory usage as the output is stored in a pixel representation. For fillmap merging, accurately estimating the memory required to store the merged output fillmap is vastly difficult. To estimate the resources required to perform fillmap merging as accurately as the estimation for fillmap merge-and-flatten, actual performing of fillmap merging process needs to be done. This is because it is impossible to predict content of the merged output fillmap without actually performing the fillmap merging process, which is resource intensive. Inaccurate estimation for fillmap merging is ineffective for a number of cases. For example, if, in accordance with the inaccurate estimation for fillmap merging, the printing system requests more memory than is actually required, the merging and flattening process will start earlier than it otherwise could, which might result in quality degradation. Similar problems might occur when the system requests less memory than actually required. With the preferred approach, the merging and flattening process is performed only in specific cases where fillmap merging fails, but there is enough memory available for merging and flattening.

By way of summary, a preferred implementation performs the following steps of processing. As each batch fillmap is created, the processing estimates the extra amount memory needed if the fillmap merge-and-flatten process is to be performed, using the batch fillmaps stored in the system. The fillmap merge-and-flatten estimation process will be discussed in more detail later in this disclosure. A combined memory usage is then calculated by summing up the estimated memory usage and current memory usage. If the combined memory is above a threshold, the processing attempts to perform fillmap merging. If fillmap merging succeeds, processing continues with further incoming PDL objects. If the fillmap merging fails, the processing proceeds to perform the fillmap merge-and-flatten process. The memory threshold is defined such that there is enough room above the threshold so that the combined memory usage will not exceed the memory limit. This guarantees the success of the fillmap merge-and-flatten process. The processing then continues with further incoming PDL objects. In most cases, the fillmap merging process should succeed without any problem and produces a combined fillmap with lossless quality. Only when some unusual cases are encountered, is the fillmap merge-and-flatten process required to ensure continuation of processing without failure due to exhaustion of memory. Therefore, the approaches presently disclosed not only maintain the functioning of the print system 200, but also maximise the output quality.

In some systems, it is possible to examine meta information of an incoming PDL object before processing the PDL object. Thus, in an alternate implementation, the estimation of fillmap merge-and-flatten process is performed prior to processing an incoming PDL object. The estimation calculates the memory needed if fillmap merge-and-flatten were to be performed for the batch fillmaps currently stored in the memory. The processing then makes a second estimate to calculate the memory required if the incoming PDL object were to be processed. The combined memory usage is then calculated by summing up the estimated fillmap merge-and-flatten memory usage, the estimated object memory usage, and the current memory. If the combined memory usage is above a threshold, the processing combines the batch fillmaps by first attempting to perform fillmap merging. If the fillmap merging fails, the processing then performs the fillmap merge-and-flatten process which is guaranteed to be successful due to the estimations. The threshold is defined such that there is enough room above the threshold so that the combined memory usage will not exceed the memory limit. When the batch fillmaps are combined, the processing then proceeds to process the incoming PDL object.

Figure 7:
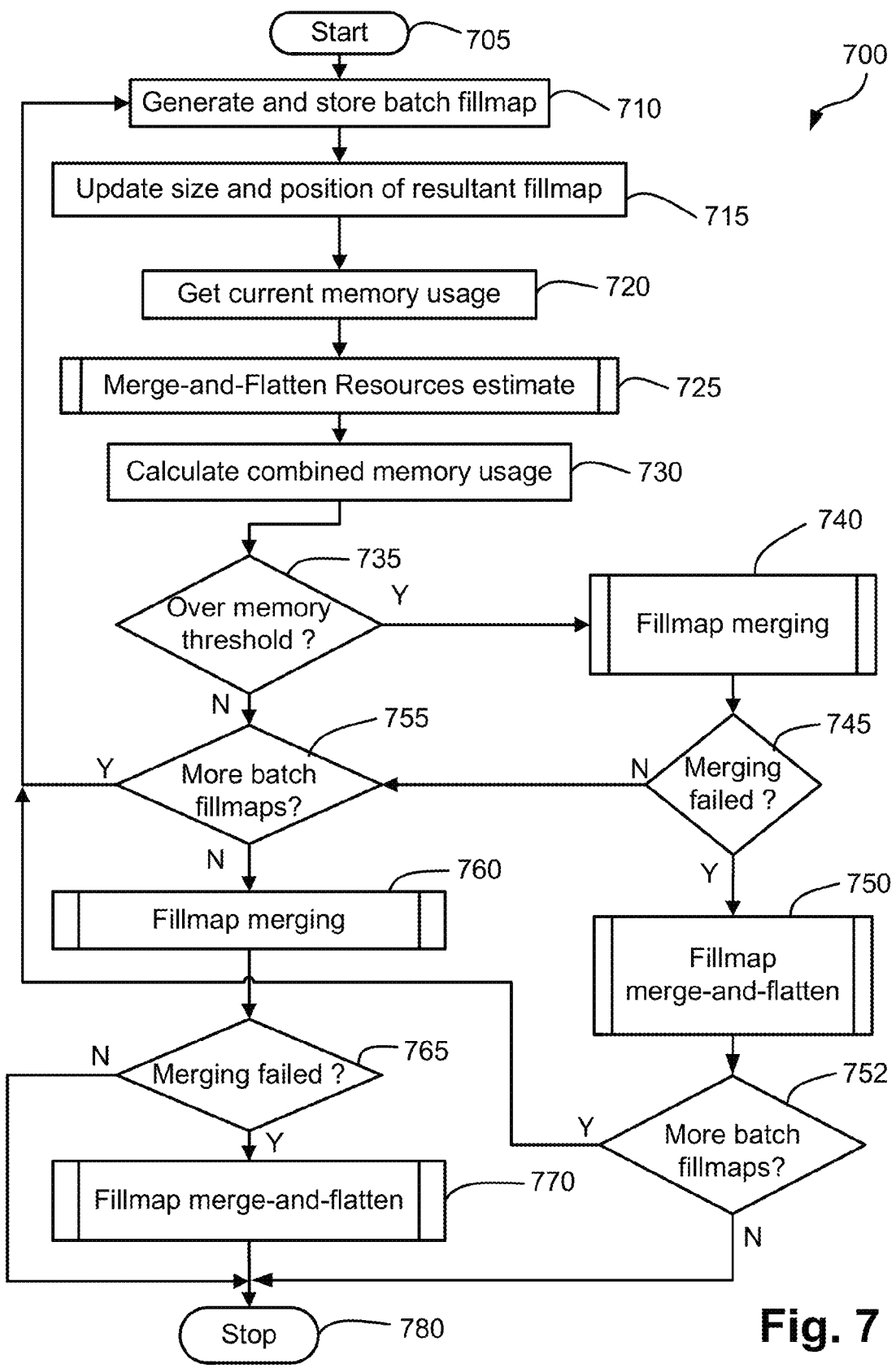
FIG. 7 is a schematic flow diagram of a first exemplary combination process, carried out by Fillmap combiner 450 of FIG. 4.

FIG. 7 is a schematic flow diagram of an overall process 700, carried out using Fillmap combiner 450, in accordance with the preferred implementation. As noted above the process 700 may be performed in the software code 240 executing on the controlling processor 270, in hardware using ASICs or FPGAs configured within the printer system 260, or a combination of both hardware and software. This process produces a single fillmap from a number of pre-generated batch fillmaps. The process 700 starts at step 705 and proceeds directly to step 710 where a batch fillmap for a portion (e.g. 500, 510, or 520) of the page display list (599) is generated by scan converter 430. Then, at step 715, the batch fillmap just generated is used to update the location and dimension of the bounding box for all batch fillmaps not yet merged. The step 715 is within a loop over all batch fillmaps in which the final invocation of step 715 eventually gives the dimension and location of the minimally-sized resultant fillmap for the page.

Following step 715, the method 700 proceeds to step 720 to obtain a current memory usage of the system. This memory usage will typically be a measure of that portion of random access memory (RAM) of the physical memory 290 allocated for print processing that is currently in use. For example, 50% of the memory 290 might be allocated for print processing of which 50% (25% of total memory capacity) might be in current use. Typically, the current memory usage is monitored and recorded by a memory manager, for example executing as part of the memory 290, and which is responsible for memory allocation. The current memory usage is updated within the processor 270 as PDL input objects are processed. Then at step 725, the method 700 estimates the amount of memory needed if the fillmap merge-and-flatten process were to be performed with the batch fillmaps currently stored in the Fillmap Store 440. The estimation, described in detail later, accurately predicts the amount of memory within which the fillmap merge-and-flatten guarantees the success of its operation. The details of the fillmap merge-and-flatten process will be discussed later in the disclosure. At step 730, a combined memory usage is calculated by the processor 270 summing up the current memory usage and the result of the fillmap merge-and-flatten estimation performed at step 725. The combined memory usage indicates the peak memory usage required if a fillmap merge-and-flatten process were to be executed.

Following step 730, a check is made at step 735 by the processor 270 to see if the combined memory usage is above a pre-defined memory threshold. If the combined memory usage is above the pre-defined memory threshold, the method proceeds to step 740. Otherwise, the method proceeds to step 755.

At step 740, the method 700 attempts the fillmap merging. Then, at step 745, the method 700 checks if the fillmap merging has failed. If fillmap merging has not failed, the method proceeds to step 755. Otherwise the method 70 proceeds to step 750. At step 750, the method 700 performs the fillmap merge-and-flatten. The fillmap merge-and-flatten merges the batch fillmaps and converts the merged result into a pixel representation in a memory-constrained way. Desirably, the output is stored as a bitmap image encapsulated in a fillmap. As discussed above, the estimation determined in step 725 guarantees the success of the fillmap merge-and-flatten. Upon completing step 750, the method 700 proceeds to step 752 which tests if there are more batch fillmaps. Where there are none, the method 700 terminates at step 780. Where there are more batch fillmaps to be processed, the method 700 returns to step 710.

At step 755, a determination is made to check if further batch fillmaps must be generated for the page. If it is determined that the display list has been fully processed and no further batch fillmaps need be generated for the page, the method 700 proceeds to step 760. Otherwise, the method returns to step 710 to process a next batch fillmap.

From steps 760 to 770, the method combines the batch fillmaps into a single fillmap in preparation for rendering into pixels to send to print engine 295. Although step 760, 765 and 770 are executed for a different purpose, they perform the same operations as seen in step 740, 745 and 750 respectively. Upon obtaining a resultant fillmap, either as a merged fillmap from step 760 or a bitmap encapsulated in a fillmap from step 770, the overall process 700 then terminates at step 780.

In certain cases, a group of objects is required to be used as a tiled pattern across a defined boundary. This is often achieved by creating a separate display list for the group of objects. The display list for the tiled pattern will be processed by creating its own batch fillmaps composed of objects that belong to the tiled pattern. When a tiled pattern is defined as a component inside another tiled pattern, a plurality of nested display lists may exist in the system. Thus, in a second implementation, the Fillmap Merge 450 will take into account multiple nested display lists when combining batch fillmaps.

Figure 8:
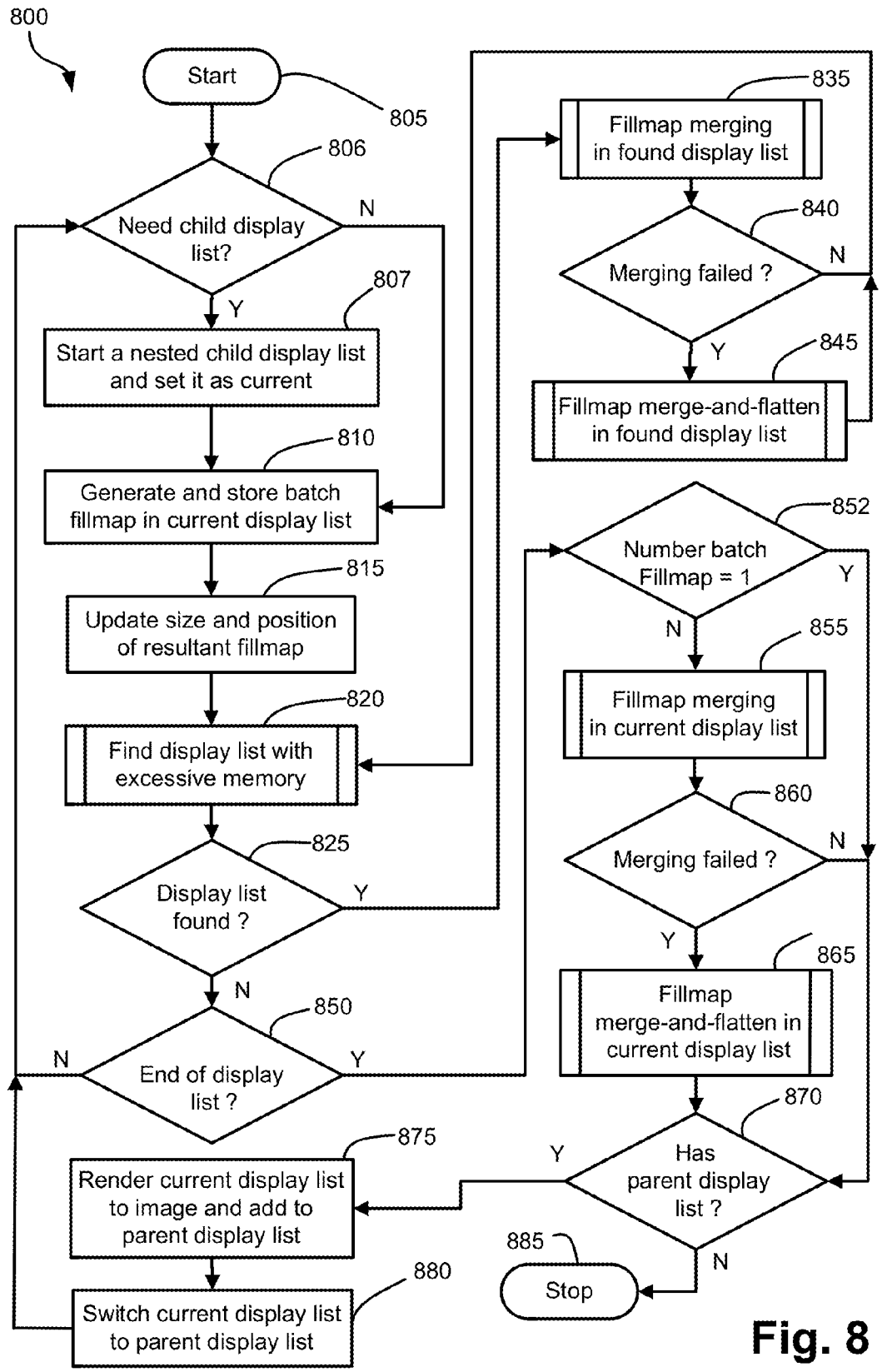
FIG. 8 is a schematic flow diagram of an alternate exemplary process combination process, carried out by the Fillmap combiner 450 of FIG. 4.

FIG. 8 is a schematic flow diagram of an overall process 800, carried out by the fillmap combiner 450, in accordance with the second implementation. The process 800 starts at step 805, with an initial current display list, and proceeds directly to step 806. The initial display list is the top-level display list within which display lists for groups of objects will be nested. At step 806, a determination is made as to whether the following incoming PDL objects are part of a group that requires the creation of a new display list, which will be nested within the current display list. The new display list will be referred to as the "child display list" to the current display list, and the current display list as the "parent display list" to the new display list. Each child display list contains its associated batch fillmap(s). If the determination is false, the method proceeds to step 810. If the determination of step 806 is true, the method 800 proceeds to step 807 to initialise a child display list and set the child display list as the current display list. At step 810 a batch fillmap is generated corresponding to a portion of the current display list by scan converter 430. Then, at step 815, the batch fillmap generated at step 810 is used to update the location and size of the bounding box for all batch fillmaps corresponding to the current display list which have not been yet combined. Like the previous method, the final invocation of step 815 eventually gives the size and location of the minimally-sized resultant fillmap for the page.

Following step 815, the method 800 proceeds to step 820 to scan through all the display lists currently stored for the page and find one display list with an excessive memory usage that is above a pre-defined memory threshold. This is done by calculating a combined memory usage for each display list separately, where each display list contains its associated batch fillmap(s). The combined memory usage includes a current memory usage at the time of the execution of step 820, and a memory estimation of performing fillmap merge-and-flatten process on the batch fillmaps in a corresponding display list. The estimation indicates the memory required if the fillmap merge-and-flatten process were to be performed with the batch fillmaps that belong to corresponding display list. At step 825, the method 800 determines if there exists a display list with excessive combined memory usage. If such a display list is found, the method 800 proceeds to step 835. Otherwise the method proceeds to step 850.

From steps 835 to 845, the method 800 initiates a sequence of combining operations in an attempt to reduce the memory usage for the current display list. The sequence is started at step 835, which makes an attempt to perform fillmap merging with the batch fillmaps that belong to the display list found at step 820. Then, at step 840, the method 800 checks if fillmap merging has failed. If fillmap merging has not failed (i.e. succeeded), the method returns to step 820 to search for a next display list with excessive memory usage. Otherwise, where fillmap merging has failed, the method proceeds to step 845. At step 845, the method 800 performs fillmap merge-and-flatten with the batch fillmaps that belong to the display list found at step 820. Upon completing the fillmap merge-and-flatten process, the method returns to step 820.

At step 850, a determination is made as to whether the method 800 has reached the end of the current display list. If it is determined that the method 800 has reached the end of the current display list and no further batch fillmaps need be generated, the method 800 proceeds to step 852. Otherwise, the method returns to step 806. In step 852, a test is performed to determine the number of batch fillmaps equals 1. If so, the method 800 proceeds to step 870. If there are more than one batch fillmap, the method proceeds to step 855.

From steps 855 to 865, the method 800 combines all the batch fillmaps associated with the current display list into a single fillmap. At step 855, the method makes an attempt to perform fillmap merging with all the batch fillmaps associated with the current display list. Then, at step 860, the method checks if fillmap merging has failed. If fillmap merging has not failed, the method proceeds to step 870. Otherwise the method proceeds to step 865 to perform the fillmap merge-and-flatten process with all the batch fillmaps associated with the current display list.

Upon completing fillmap merge-and-flatten of step 865, the method proceeds to step 870 where a determination is made to check if the current display list has a parent display list. If the current display list does not have a parent display list, the method terminates at step 885. Otherwise, the method proceeds to step 875. At step 875, the current display list is rendered into an image, which is then added as an object to the parent display list. Following step 880, the method sets the parent display list as the current display and returns to step 806 to process further incoming PDL objects.

Figure 9:
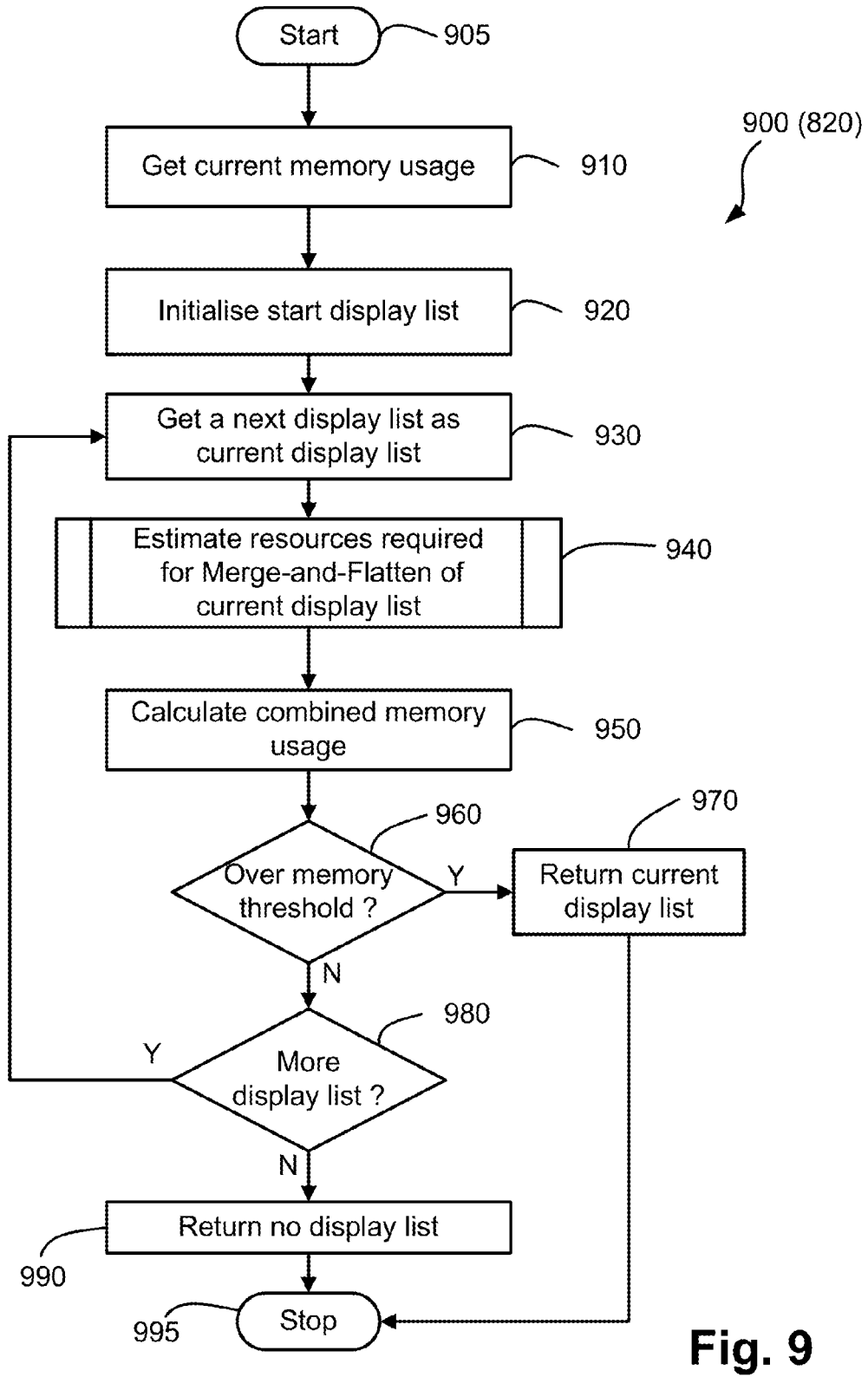
FIG. 9 is a schematic flow diagram of method 830 of finding a display list with excessive combined memory usage as used in the process of FIG. 8.

The processing 820 of finding display list with excessive combined memory usage is shown in additional detail in the method 900 of FIG. 9. The processing starts at step 905 and proceeds directly to step 920, where a current memory usage is obtained at the time of execution by the processor 270. Then, at step 920 the processor 270 sets the starting display list in the list of nested display lists, through which the processing of the method 900 will loop to find a display list with excessive combined memory usage.

Following step 930, the processing initiates a loop by obtaining a next display list and setting it as the current display list. In the first iteration of the loop, the next display list is the starting display list as set in step 920. Otherwise, the next display list is the one which contains the current display list in the list of nested display lists. Then, at step 940, the method 900 estimates the amount of memory resources needed if the fillmap merge-and-flatten process were to be performed on the batch fillmaps in the current display list. The estimation process 940 will be discussed in more detail later in this disclosure. After step 940, the processing proceeds to step 950 to calculate a combined memory usage. The combined memory usage includes the current memory usage, known to the processor 270, for example from a memory controller (not illustrated) but typically associated with the memory 290, and the memory estimation of the fillmap merge-and-flatten process from step 940.

From step 950, the processing makes a determination, at step 960, to check if the combined memory usage is above a pre-defined memory threshold. If the combined memory usage is above the pre-defined memory threshold, the processing proceeds to step 970, where the processing returns the current display list as the display list with excessive combined memory usage, and then the process 900 terminates. Otherwise, the processing proceeds to step 980. At step 980, the processing determines if there are more display lists that need to be checked for excessive memory usage. If the determination is true, the processing returns to step 930 to continue the loop. Otherwise, the processing proceeds to step 990, where the processing returns an indication (such as a NULL pointer) to indicate that no excessive display list with excessive memory requirement is found. Following step 990 and step 970, processing then terminates at step 995.

Pre-Defined Memory Threshold

Figure 10:
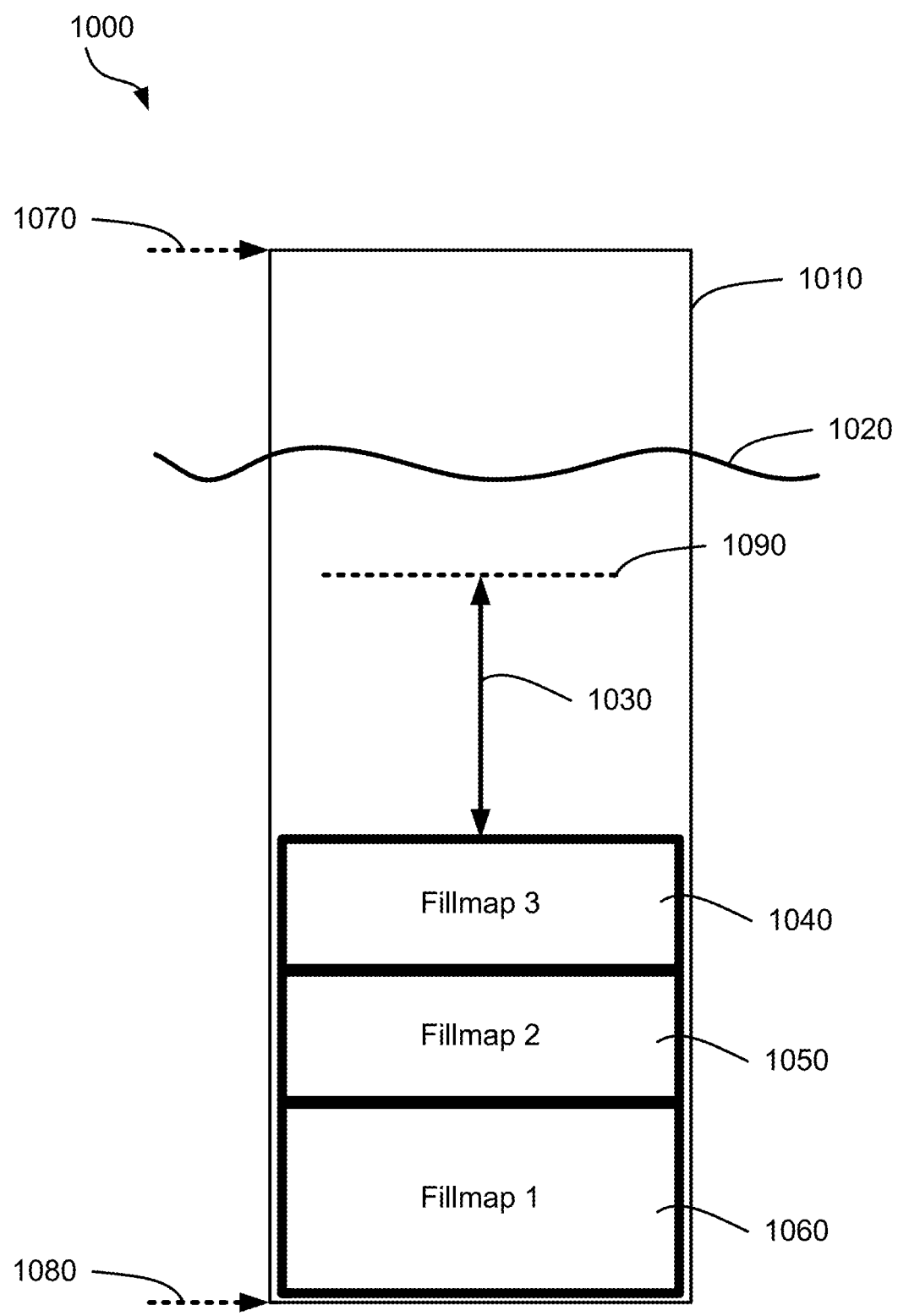
FIG. 10 demonstrates an example of a combined memory usage that is below a pre-defined memory threshold.

FIG. 10 illustrates an example 1000 of a combined memory usage 1090 that is below a pre-defined memory threshold. In the example 1000, the available system memory 1010 has the range from 1080 to 1070, where 1070 indicates the system memory limit. Line 1020 indicates the memory threshold above which a combination process is needed to reduce memory usage during print operations. This memory threshold is also referred to as high-water mark. In the preferred implementation, the memory threshold is pre-defined as a fixed value in the system throughout the processing of the PDL input. A guideline for defining the high-water mark is to leave enough memory head room (between 1070 and 1020)

below the end of allowable memory, such that when the combined memory usage goes above the high-water mark, it does not exceed the memory limit 1070. This is to make sure the fillmap merge-and-flatten process will have enough memory to guarantee its success. In an alternate implementation, where the complexities of the incoming PDL objects are deterministic, the memory threshold can be dynamically adjusted to maximise the usage of the usable memory below the high-water mark 1020. There are three batch fillmaps created in the example 1000, fillmap one 1060, fillmap two 1050 and fillmap three 1040. The example 1000 is now described in reference to the preferred implementation as presented in FIG. 7. After fillmap three 1040 is processed at steps 710 and 715, a current memory usage is obtained at step 720. The current memory usage is the sum of the memory occupied by the batch fillmaps currently stored in the system, being 1040, 1050 and 1060. An estimation is then made, at step 725, which predicts that an additional amount 1030 of memory is needed if fillmap merge-and-flatten is to be performed successfully. At step 730, a combined memory usage 1090 is calculated. At step 735, it is determined that the combined memory usage 1090 is below the high-water mark 1020. Thus, the system will move on to step 755 and carry on processing batch fillmaps without requiring a combination process.

Figure 11:
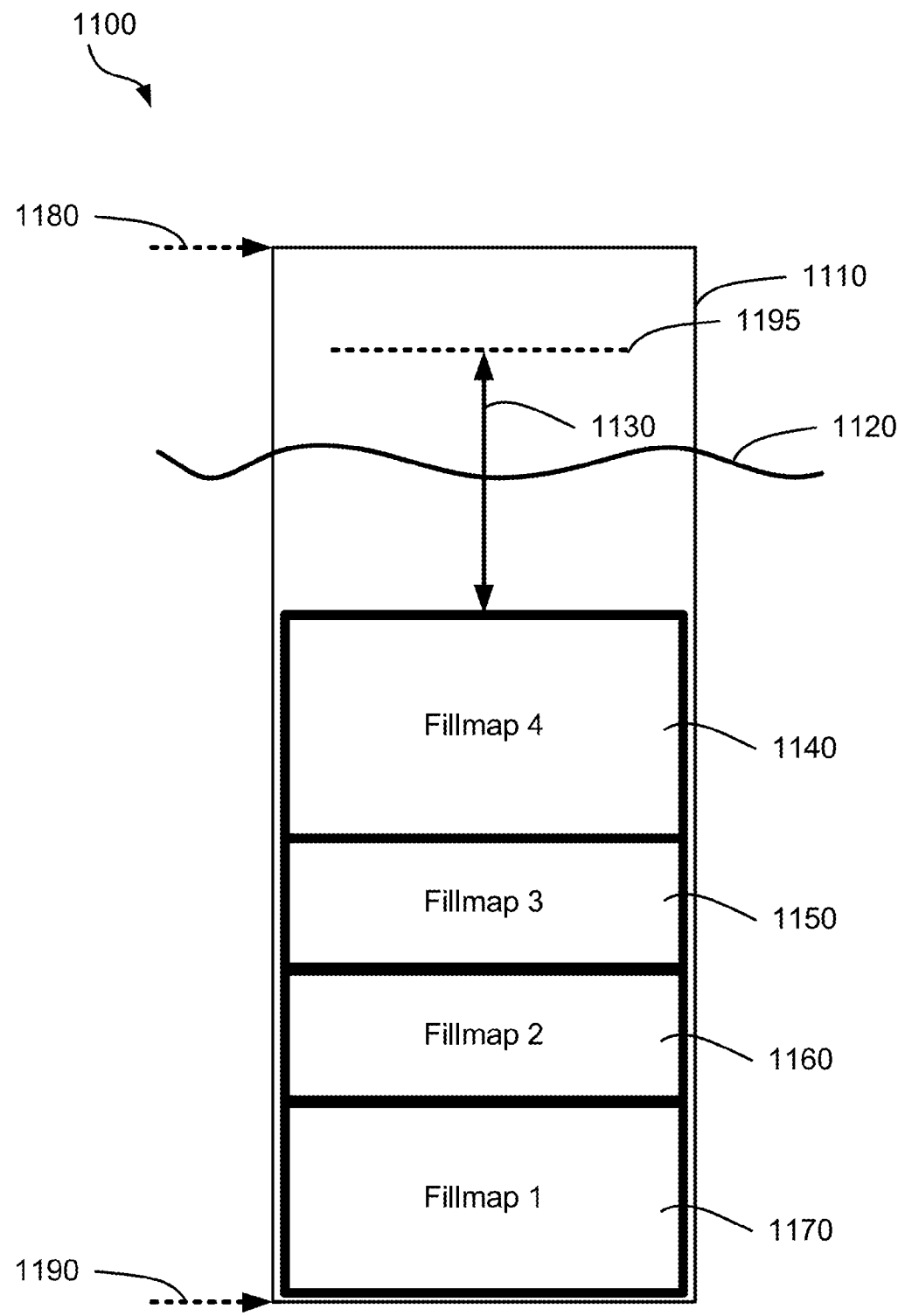
FIG. 11 demonstrates an example of a combined memory usage that is above a pre-defined memory threshold.

FIG. 11 demonstrates an example 1100 of a combined memory usage 1195 that is above a pre-defined memory threshold. In the example 1100, the available system memory 1110 has the range from 1190 to 1180, where 1180 indicates the system memory limit. Line 1120 is the memory threshold, or high-water mark, above which a combination process is needed to reduce memory usage. There are four batch fillmaps created in the example 1100, fillmap one 1170, fillmap two 1160, fillmap three 1150 and fillmap four 1140. The example 1100 is now described in reference to the preferred embodiment as presented in FIG. 7. After fillmap four 1140 is processed at step 710 and 715, a current memory usage is obtained at step 720. The current memory usage is the sum of the memory occupied by the batch fillmaps currently stored in the system, being 1140, 1150, 1160 and 1170. An estimation is then made, at step 725, which predicts an additional amount 1130 of the memory 290 that is needed if fillmap merge-and-flatten is to be performed successfully. At step 730, a combined memory usage 1195 is calculated. At step 735, it is determined that the combined memory usage is above the high-water mark 1120. Thus, the system will move onto step 740 to start the process of combining batch fillmaps to reduce the memory usage.

Estimation

Figure 12:
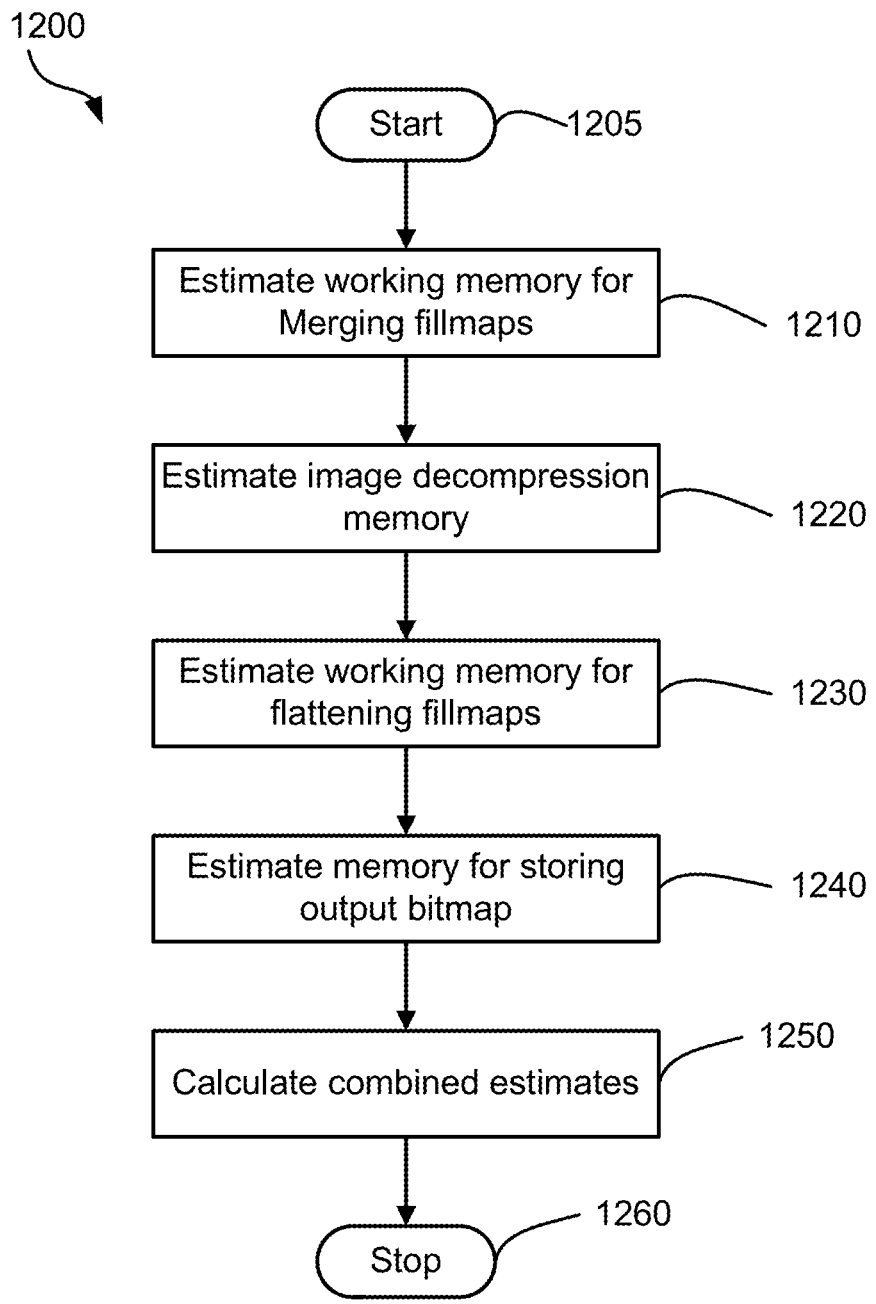
FIG. 12 is a schematic flow diagram that shows preferred additional processing detail of estimating fillmap merge-and-flatten memory usage, as used in FIG. 7 and FIG. 9.

The advantage of the fillmap merge-and-flatten process is the deterministic nature of its memory usage. FIG. 12 is a schematic flow diagram of a method 1200 that shows the additional processing detail of estimating the memory usage of the fillmap merge-and-flatten process, as seen in step 725 and step 965, in a preferred implementation. The method 1200 is preferably implemented in software, stored in the memory 290 and executed by the processor 270, and starts from step 1205 and proceeds directly to step 1210, where an estimation is made for the working memory needed to merge accumulated batch fillmaps. In the method 1200, this estimation is based on the characteristics of the fillmap data structure and considers the number of edge crossings that need to be maintained during fillmap merging. An edge crossing is a data structure that maintains information from all accumulated batch fillmap edges that intersect a scanline at a particular pixel location. Therefore, the size of each edge crossing depends on the number of accumulated batch fillmaps being merged, and in the worst case, there exists one edge crossing for every pixel on a scanline. The preferred implementation of the method 1200 calculates the estimate assuming the worst case scenario. An alternate implementation can calculate the estimate using the maximum number of edge intersections with a scanline from all accumulated batch fillmaps. At step 1220, the processing estimates the memory for image decompression. This is because the input PDL objects may contain compressed images that require additional memory for image decompression prior to use in rendering the merged fillmap. An example of such an image is a JPEG compressed image. Following step 1220, processing proceeds to step 1230 to estimate the working memory needed for flattening merged batch fillmaps into a pixel representation. The flattening operation happens as part of the same process as the merging of batch fillmaps. This is discussed in more detail later in this disclosure. This estimation varies depending on the flattening algorithm that is used. Preferably, this estimation includes the memory needed for buffering the output colours of a compositing operation, such those defined for Porter and Duff compositing. At step 1240, the processing estimates the memory needed for storing the resultant bitmap data. The method 1200 then calculates a total estimated memory usage, at step 1250, by summing up the estimates obtained from step 1210, step 1220, step 1230 and step 1240. From step 1250 the processing terminates at step 1260.

Fillmap Merge and Flatten Process

Figure 13:
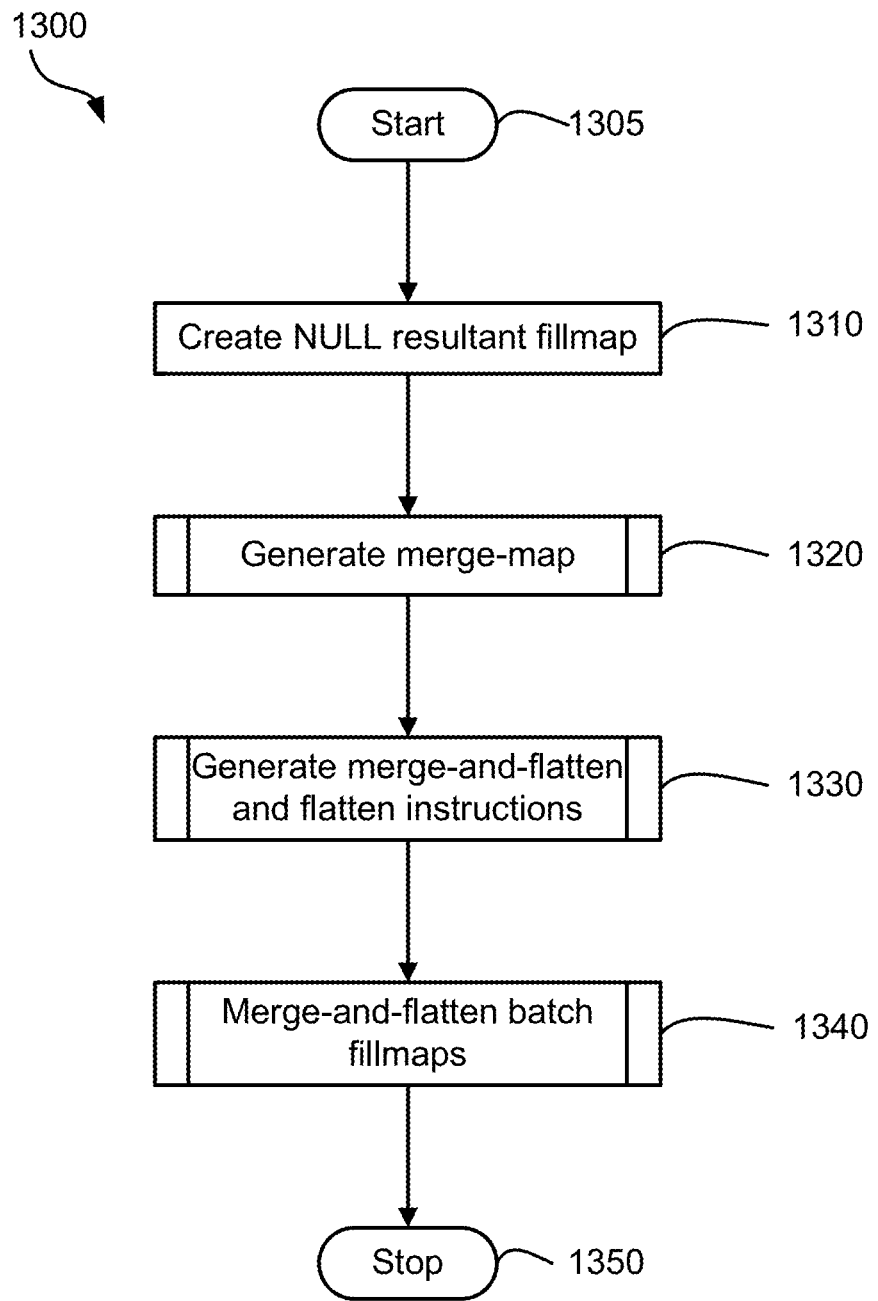
FIG. 13 is a schematic flow diagram that shows preferred processing detail of fillmap merge-and-flatten process, as used in FIG. 7 and FIG. 8.

FIG. 13 is a schematic flow diagram that shows additional processing detail of the fillmap merge-and-flatten process, as seen in steps 750, 770, 845 and 865. Processing 1300 starts from step 1305 and proceeds directly to step 1310, where a null, minimally-sized resultant fillmap is created. This step creates an entirely empty fillmap—that is, with empty data for all tiles.

Following step 1310, processing proceeds to step 1320, where a data representation, referred to as a "merge-map" for the batch fillmaps, is generated. The merge-map contains information that defines strips of non-overlapping regions, where each region corresponds to zero or more input batch fillmaps. The merge-map is used, in step 1330, to generate a sequence of flatten and merge-and-flatten instructions for the batch fillmaps. Following step 1330, step 1340 operates to merge and flatten the batch fillmaps into a pixel representation. The flatten operations happens on the fly as the batch fillmaps are merged. This will be discussed in more detail later in this disclosure. The overall process 1300 then terminates at step 1350.

Figure 14:
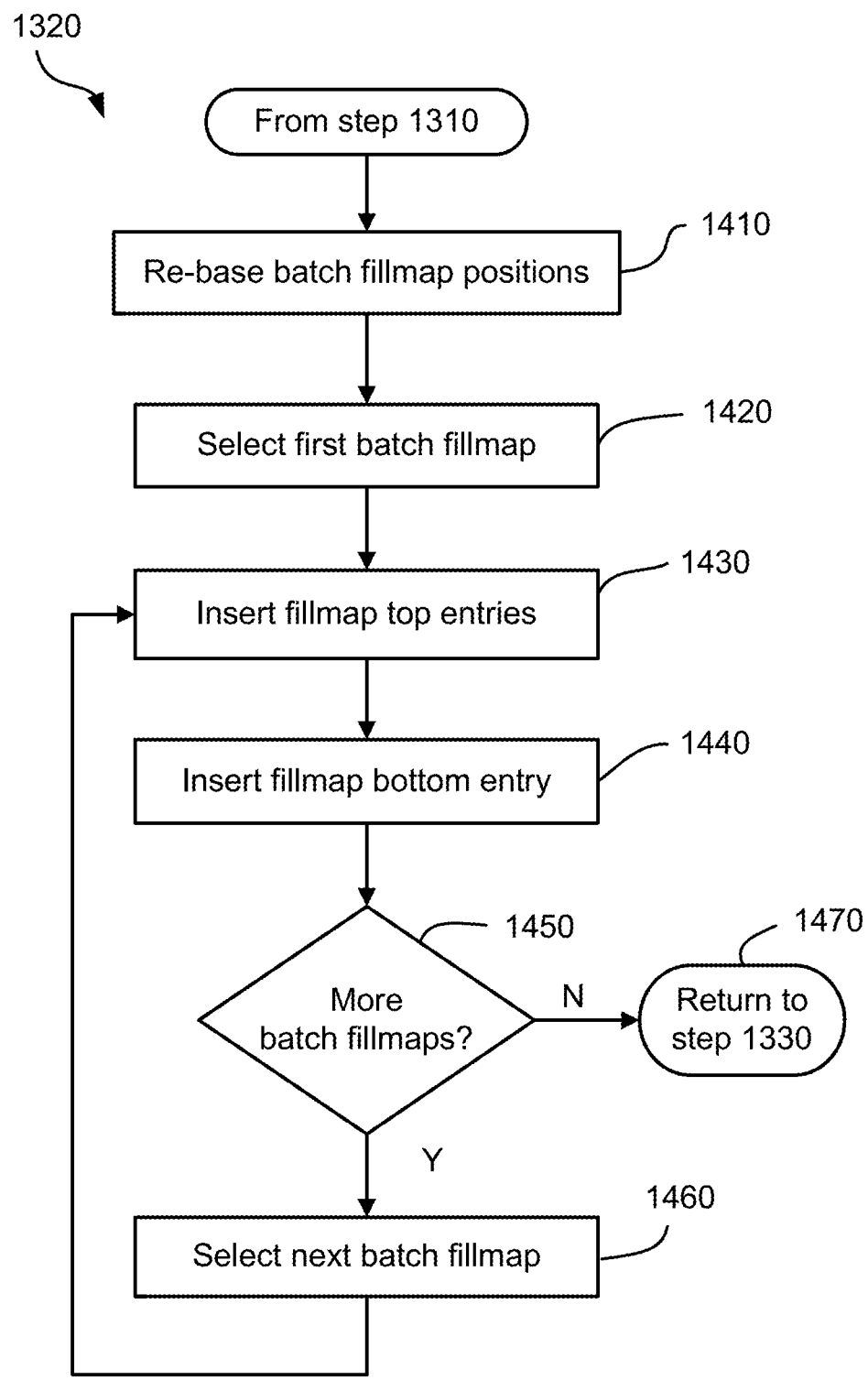
FIG. 14 is a schematic flow diagram of the process of generating a merge-map as used in the method of FIG. 13.

The process 1320 of producing a merge-map is shown in additional detail in FIG. 14. When a batch fillmap is created, the location of the batch fillmap is initially expressed in tile units offset from the page origin. Once the minimally-sized null fillmap for storing the merged batch fillmaps has been created in step 1310, a vector subtraction allows the locations of batch fillmaps to be re-expressed in terms of their offset from the position of the resultant fillmap. This procedure is the first step 1410 in the process 1320 to generate a merge-map for the batch fillmaps. Referring to FIG. 6, this process sets the location of batch fillmap A 610 to (0, 0), batch fillmap B 620 to (7, 13) and batch fillmap C 630 to (8, 6).

From step 1410, process 1320 proceeds to step 1420, where a first fillmap for the set of batch fillmaps to be merged is selected. Note that this fillmap need not be the batch fillmap with lowest fillmap priority. For the purposes of process 1320, batch fillmaps may be ordered in any manner. Following step 1420, the process proceeds to step 1430 where the "top entries" for the current batch fillmap are inserted into the merge-map. Top entries of a batch fillmap are the top-left and top-right coordinates of the bounding box of the batch fillmap. Referring again to FIG. 6, the top entries for fillmap B 620 are obtained from the insertion and removal locations B.i 626 and B.o 622 at locations (7, 13) and (20, 13) respectively. Similar top entry insertion and removal locations for fillmap A 610 and fillmap C 630 are shown in FIG. 6 at A.i 616, A.o 612, C.i 636 and C.o 632.

From step 1430, process 1320 moves to step 1440, where the single "bottom entry" for the current fillmap is inserted into the merge-map. A bottom entry of a batch fillmap is the bottom-left coordinate of the bounding box of the batch fillmap. Referring to FIG. 6, the bottom entry for fillmap B 620 is obtained from the removal location B.o 624 at location (7, 24). Equivalent bottom entries for fillmaps A 610 and C 630 are shown at A.o 614 and C.o 634. Following step 1440, the process of constructing a merge-map proceeds to step 1450. Here, if further batch fillmaps are to be processed, the process 1320 proceeds to step 1460, where the next batch fillmap in the set to be merged is selected. From step 1460, the process 1320 returns to step 1430. If, at step 1450, no further batch fillmaps remain to be processed, process 1320 then returns to step 1330 at step 1470.

With reference once again to FIG. 6, the process of generating a merge-map is now illustrated in greater detail. If process 1320 processes batch fillmaps from FIG. 6 in reverse priority order, construction of the single resultant merge-map follows the sequence of illustrations given in FIGS. 15A, 15B and 15C. The state of the merge-map after processing each of the three batch fillmaps is shown in FIGS. 15A, 15B and 15C at labels 1500, 1520 and 1540 respectively.

Figure 15A:
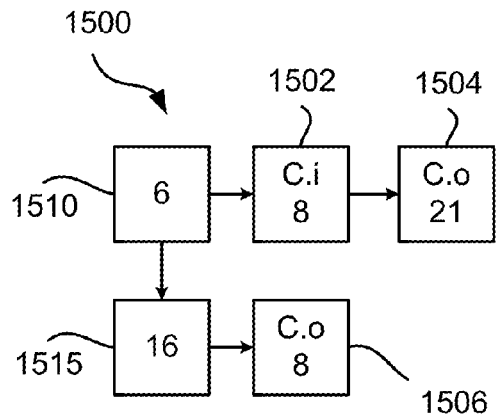
FIG. 15A to FIG. 15C show an example of merge-map generation.

Referring to FIG. 15A, selection of fillmap C 630 leads to insertion of fillmap top entries 1502 and 1504. Insertion of the corresponding bottom entry 1506 then follows. Note that all fillmap entries are inserted in strict order of increasing x co-ordinate. Thus fillmap entry 1502 (with x co-ordinate 8) is inserted into the merge-map before fillmap entry 1504 (with x co-ordinate 21).

Note also that the head entry for any merge-map row defines the y co-ordinate of the following row entries. Thus entry 1502, corresponding to fillmap insertion location C.i, has effective tile co-ordinates (8, 6). The head entry for the first row of the merge-map in state 1500 is shown in FIG. 15A at label 1510. Head entries are themselves arranged in an ordered list of increasing y co-ordinate. Head entry 1515, with y co-ordinate 16, is thus linked after head entry 1510.

Figure 15B:
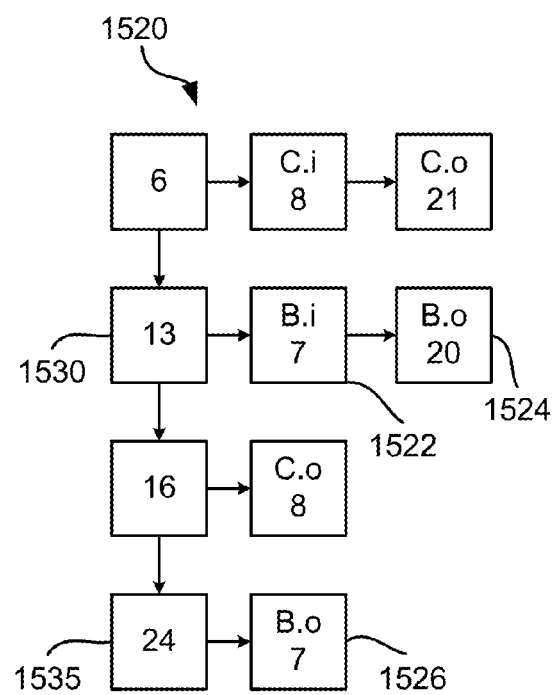
Figure 15C:
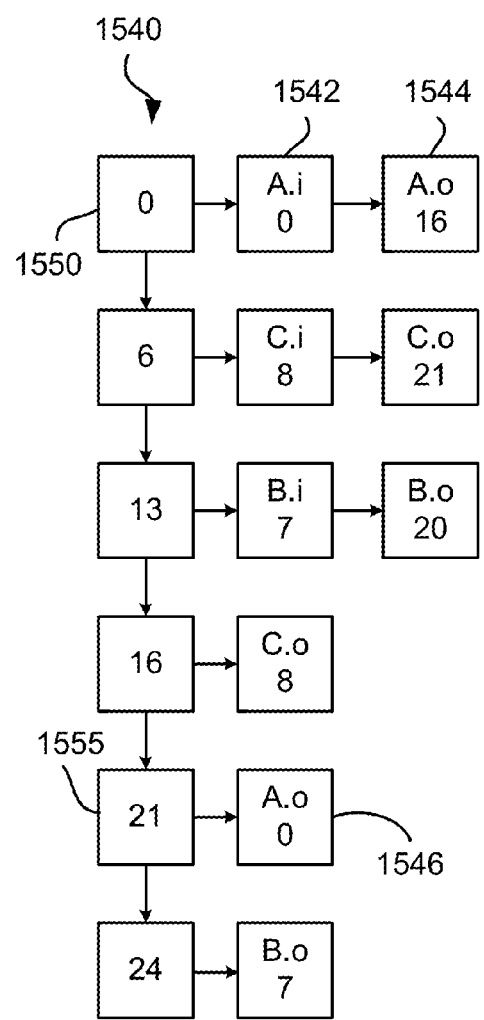

Selection and processing of fillmap B 620 leads to insertion of row head entries 1530 and 1535, top entries 1522 and 1524, and bottom entry 1526 from FIG. 15B. The cumulative state of the page merge-map after this is shown at label 1520.

Finally, selection and processing of fillmap A 610 leads to insertion of row head entries 1550 and 1555, top entries 1542 and 1544, and bottom entry 1546 from FIG. 15C. The overall state of the page merge-map following this is shown at label 1540.

Figure 16:
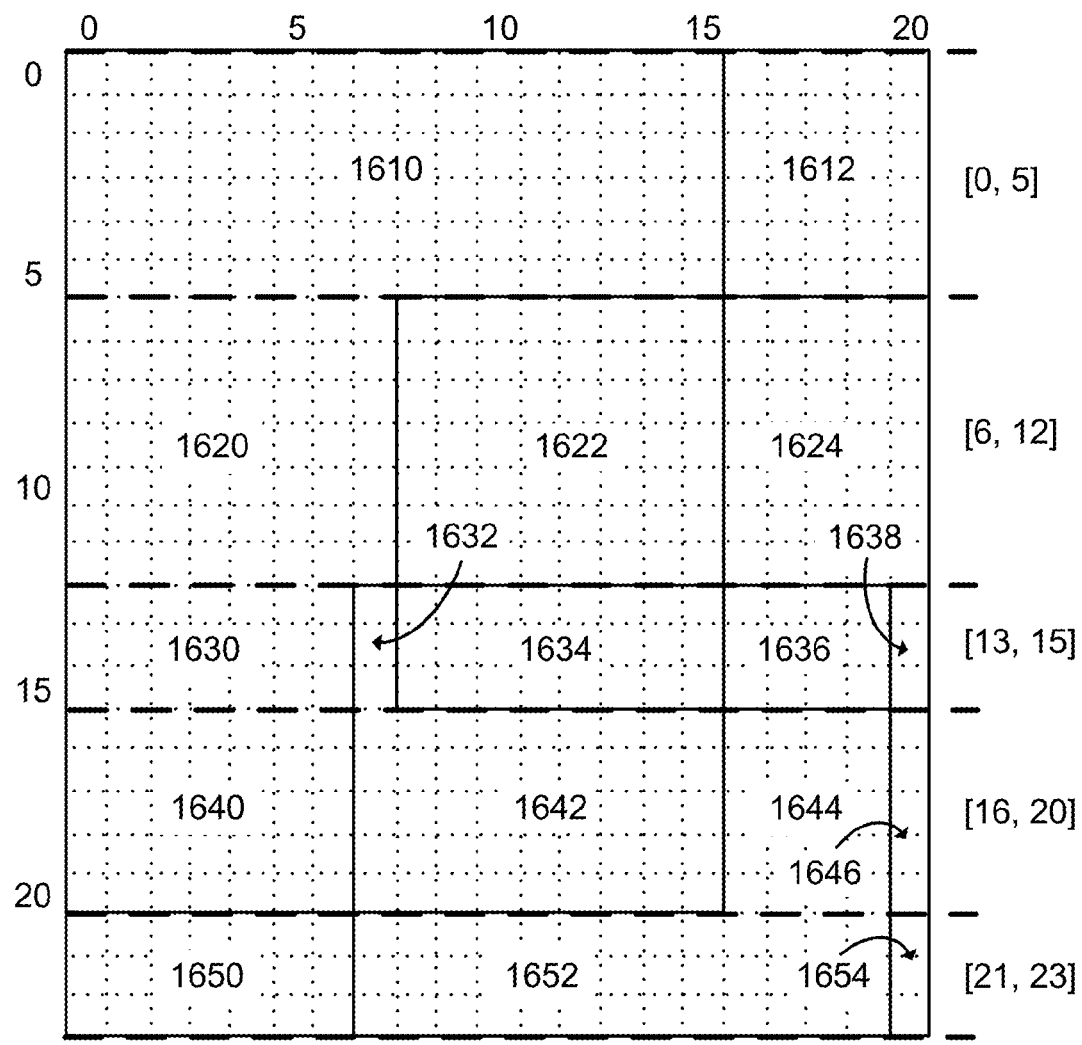
FIG. 16 shows the arrangement of resultant fillmap strips for the batch fillmaps from the example of FIG. 5.
Figure 17:
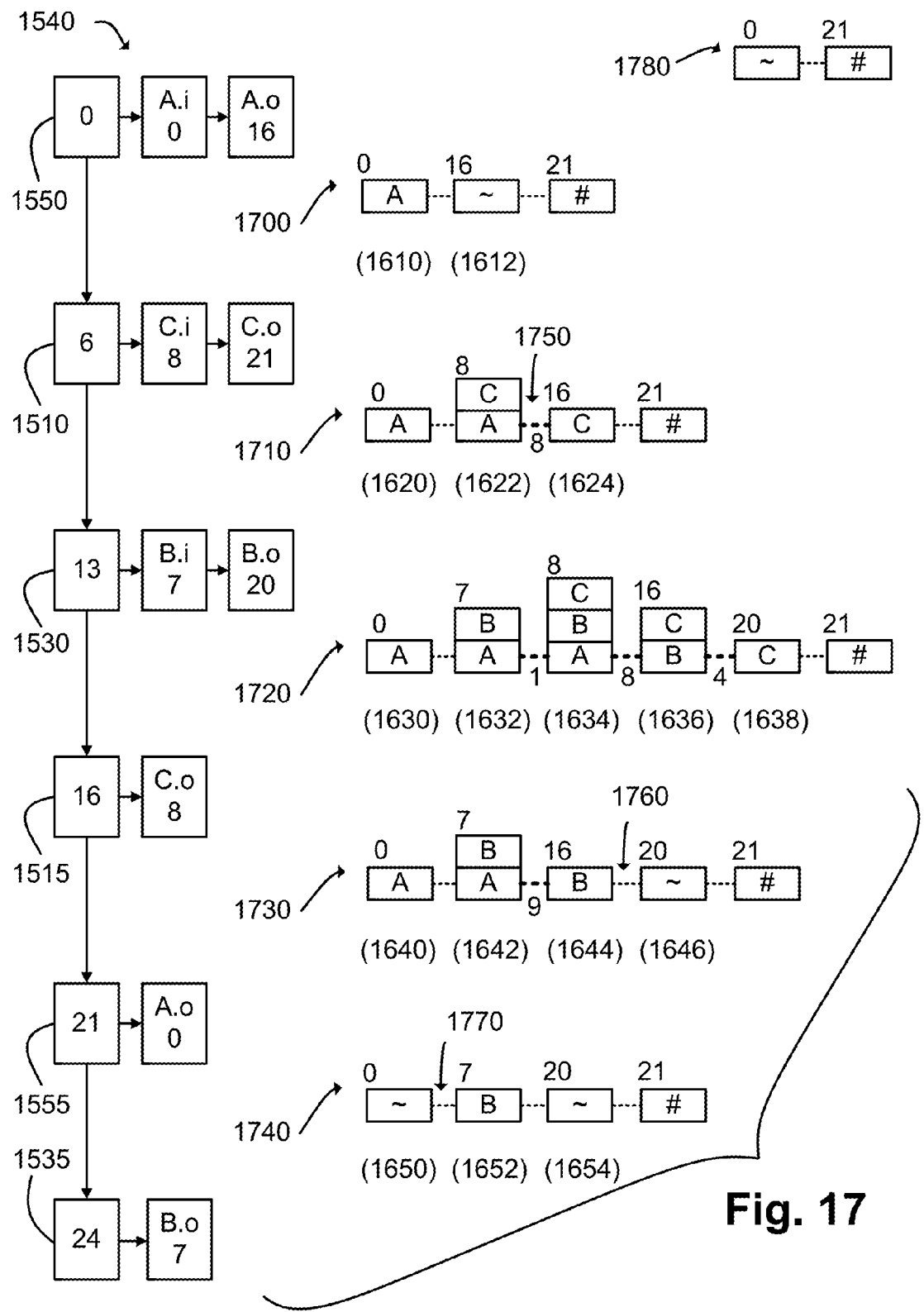
FIG. 17 shows the final state of the merge-map for the example of FIG. 5 and the resulting sequence of strip descriptors.

FIG. 17 shows an enlarged view of the final state of the merge-map 1540 of FIG. 15C. The six row entries (1550, 1510, 1530, 1515, 1555, 1535) shown define a total of five bands, or strips, to be used for merging. These are, in order, resultant fillmap strips [0, 5], [6, 12], [13, 15], [16, 20], and [21, 23], each being denoted by its first and last tile row co-ordinate. FIG. 16 shows these five strips superimposed on the merged fillmap from FIG. 6.

Referring now to FIG. 16, each fillmap strip comprises one or more separate or independent rectangular regions. The contents of each region are constructed from some combination of batch fillmaps A, B and C from FIG. 6, or are empty regions. In FIG. 16, regions 1612, 1650, 1646 and 1654 are all empty regions. Regions 1610, 1620, 1630, and 1640 contain tiles from fillmap A only. Similarly, regions 1624 and 1638 in the resultant merged fillmap contain tiles from fillmap C only, while regions 1644 and 1652 contain tiles only from fillmap B. For the resultant fillmap, destination tiles in each of these regions may be directly copied, or else referenced, from the appropriate batch fillmap.

Remaining regions are defined by the combination of two or more batch fillmaps. For example, in strip [6, 12], region 1622 is defined by the combination of fillmaps A and C. From strip [13, 15], region 1632 sources tiles from fillmaps A and B. Region 1634 from the same strip sources tiles from fillmaps A, B, and C, while region 1636 combines fillmaps B and C only. Like region 1632, region 1642 from the following strip [16, 20] combines tiles from fillmaps A and B.

Returning once more to FIG. 17, the association between the regions shown in FIG. 16 and the combinations of batch fillmaps from FIG. 6 is shown in the five strip descriptors 1700, 1710, 1720, 1730 and 1740. Each strip descriptor encodes the starting x co-ordinate, in tile units, for each of the regions within the strip, together with an ordered stack of one or more batch fillmaps to be merged for each region. Empty regions are specially encoded, as for region 1612.

Generation of each successive strip descriptor uses the previous strip descriptor together with the current merge-map row. For example, strip descriptor 1710 from FIG. 17 is constructed from strip descriptor 1700 and merge-map row 1510. Similarly, strip descriptor 1720 is constructed from descriptor 1710 and merge-map row 1530. The first strip descriptor 1700 is constructed from merge-map row 1550 and the empty strip descriptor 1780.

Note that, for any page, the empty descriptor always contains two entries. The first of these, at x=0, encodes a null (or empty) fillmap stack. NULL stacks are indicated by the "~" character in FIG. 17. The second entry encodes a special END entry, indicated in FIG. 17 by the "#" character. The second entry for the empty descriptor is always at x=M, with M equal to the width, in tiles, of the minimally-sized resultant fillmap.

In FIG. 17, for each strip descriptor, the dashed lines between the stacks of fillmaps to be merged denote either a merge-and-flatten instruction or a flatten instruction. A merge-and-flatten instruction is so named because the region defined by the strip descriptor at that point contains two or more fillmaps to be merged and flattened. A flatten instruction is so named because only a single fillmap or an empty region need flattened, or copied, for the region defined by the strip descriptor at that point. Thick dashed lines in FIG. 17 (at label 1750, for example) denote fillmap merge-and-flatten instructions. Other dashed lines represent flatten instructions (at label 1760 and 1770, for example). Note that a NULL operation exists for every empty region in the resultant fillmap.

The merge-and-flatten and flatten instructions for the collection of strip descriptors define the set of instructions executed in step 1340 from FIG. 13. A more detailed explanation of the method of generating these instructions (step 1330 from FIG. 13) is illustrated in FIG. 18.

Figure 18:
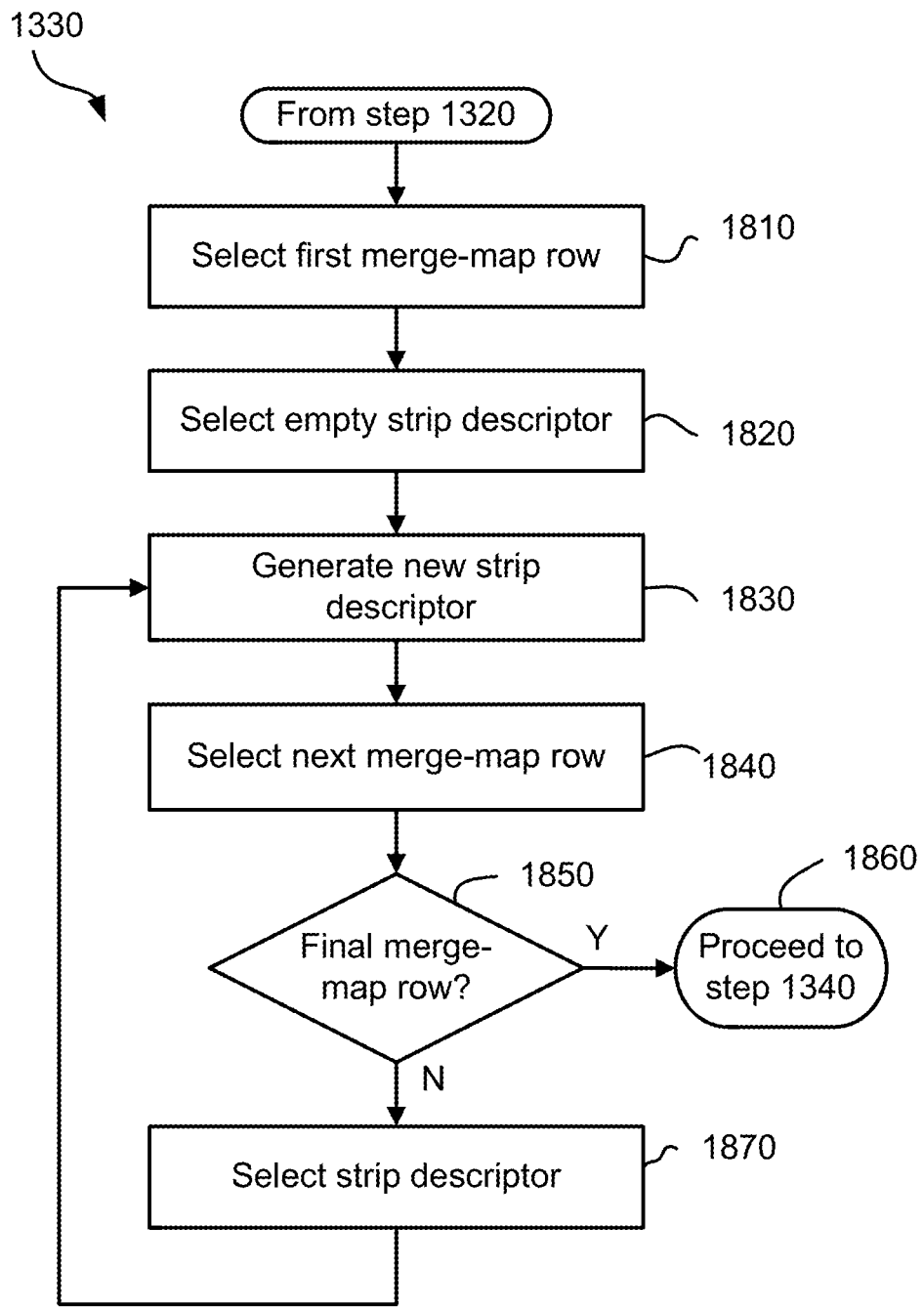
FIG. 18 is a schematic flow diagram of the method 1330 for generating a sequence of merge-and-flatten and flatten instructions from a merge-map as used in FIG. 13.

FIG. 18 shows the method 1330 of iterating through the ordered list of merge-map rows to generate strip descriptors. The method 1330 starts at step 1810 where the first merge-map row is selected. The method 1330 then proceeds to step 1820 where the empty strip descriptor is selected. Thereafter, the method 1330 proceeds to step 1830 where a new descriptor is generated. From step 1830, the method 1330 selects the next row in the merge-map at step 1840. From step 1850, the method 1330 then terminates at step 1860 if the selected row is the final row in the merge-map. Otherwise, the method 1330 proceeds to step 1870 where the strip descriptor generated in step 1830 is selected. The method then returns to step 1830.

Figure 19:
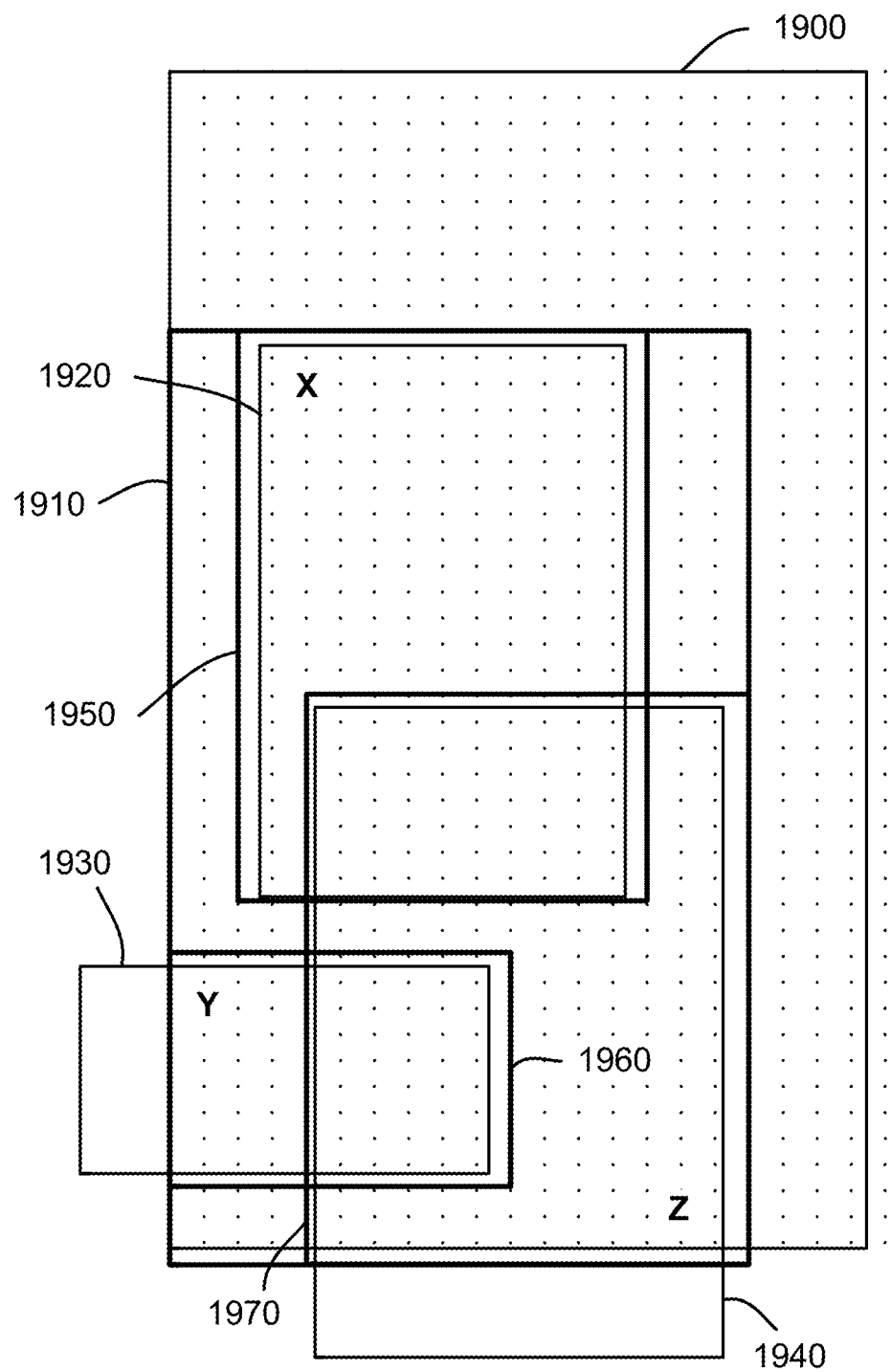
FIG. 19 shows the relationship between fillmap dimensions and batch object bounding box sizes for several batch fillmaps.

FIG. 19 shows the size of the x-y bounding box for batch display list objects and the x-y size of resultant batch fillmaps. In the diagram, the dotted grid denotes fillmap tile corner points. Thin line 1900 defines the page outline, while thick line 1910 defines the size of the merged fillmap for the page. Batch fillmaps X, Y and Z for the page, with display list bounding boxes 1920, 1930 and 1940 respectively, have encoded fillmap dimensions represented by the thick lines 1950, 1960 and 1970.

Note that fillmap Y has cropped horizontal extent, since some portion of the display list for the batch lies outside the leftmost printable section of the page. Similarly, batch fillmap Z has cropped vertical extent, since a portion of the display list for the batch lies below the bottom-most printable section of the page.

Figure 20:
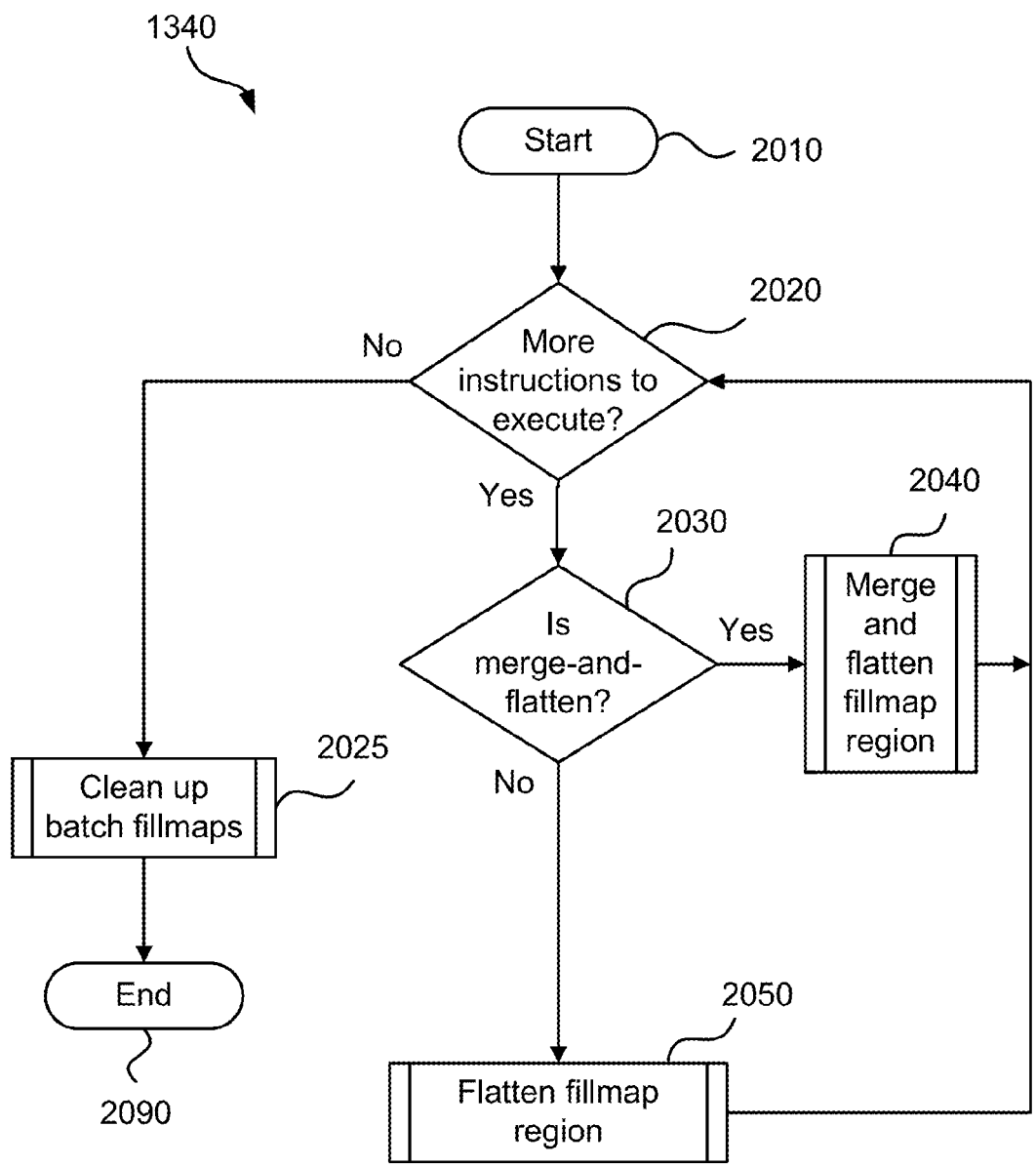
FIG. 20 is a schematic flow diagram of the process of merge and flatten batch fillmaps as used in the method of FIG. 13.

FIG. 20 shows a flowchart of step 1340, where batch fillmaps are merged and flattened into a bitmap, according to a preferred implementation. The process 1340 begins at step 2010 where the merge-and-flatten and flatten instructions generated at step 1330 are passed in. Then, at step 2020, the process 1340 iterates through the instructions given to step 2010 by examining whether there are more instructions to execute. If there are more instructions, then step 2030 examines whether the next instruction is a merge-and-flatten instruction, or a flatten instruction. If the next instruction is to merge and flatten a region, then process 1340 proceeds to step 2040 where the region is merged and flattened. Then the process 1340 returns to step 2020. If step 2030 determines that the next instruction is a flatten instruction, step 2050 is executed to convert all the tiles within the region into a pixel representation through the rasterising of image data described by the fillmap description for each tile. From step 2050, the process then returns to step 2020 to process more instructions. If there are no more merge-and-flatten or flatten instructions at step 2020, then process 1340 advances to step 2025 where batch fillmaps are cleaned up and memory associated with the batch fillmaps are freed. The process 1340 then ends at step 2090 after step 2025 has been completed.

Figure 21:
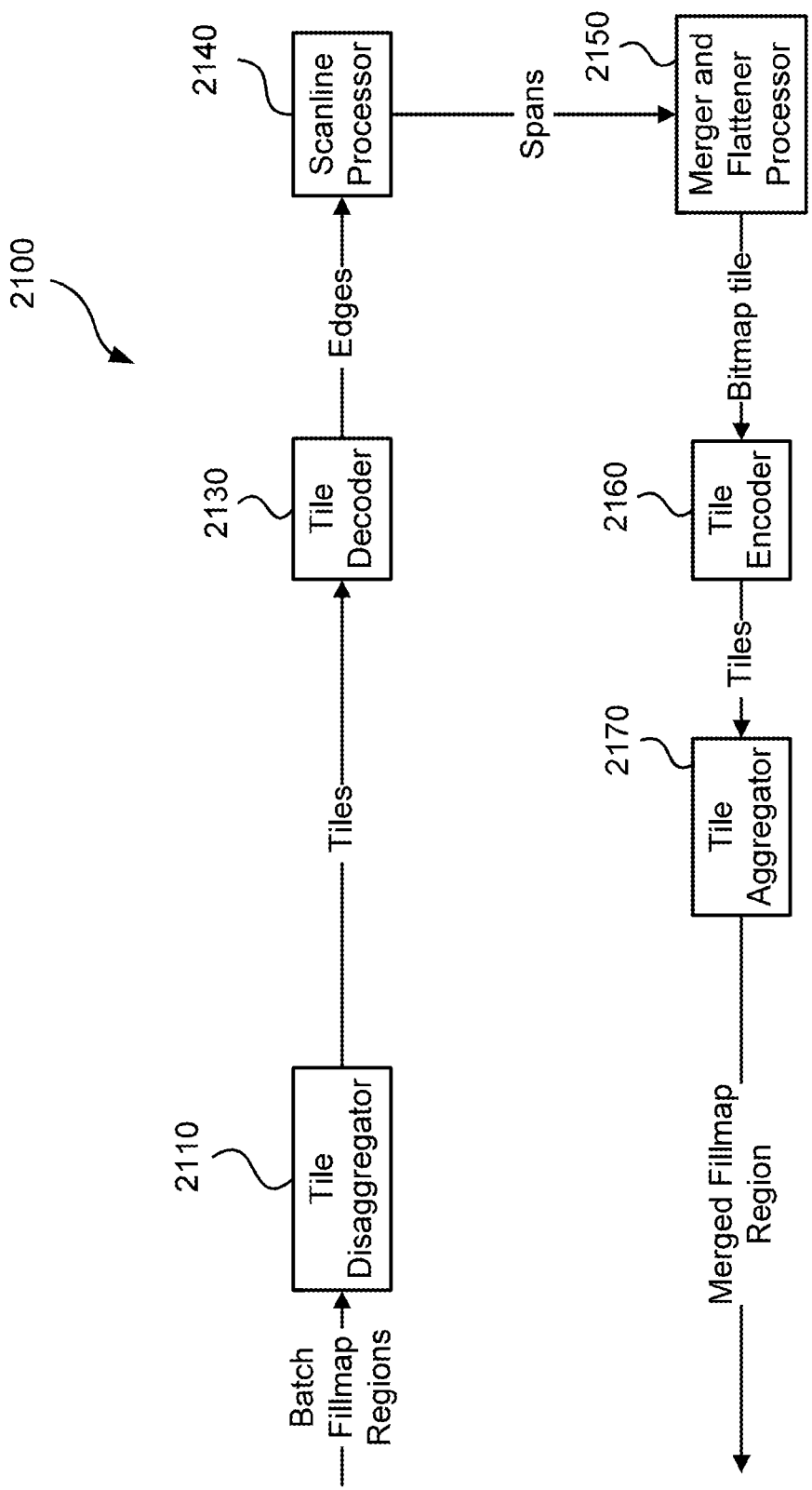
FIG. 21 is a schematic data flow diagram illustrating a preferred implementation of the fillmap region merge-and-flatten processor.

In a preferred implementation, the process of merging and flattening a fillmap region is performed by a fillmap region merge-and-flatten processor 2100, seen in FIG. 21, and which is typically implemented in software executed by the controller processor 270. The fillmap region merge-and-flatten processor 2100 is part of the fillmap combiner 450 and will now be described. As seen in FIG. 21, batch fillmap regions to be merged are input into a Tile Disaggregator 2110 to be processed one tile at a time by the controller processor 270. Each input batch fillmap tile comprises a set of pixel aligned edges that are entropy encoded. Each tile of the merged fillmap is the combined result of merging the corresponding tile from each batch fillmap. For each merged tile, the corresponding batch fillmap tiles that need to be merged are entropy decoded by the Tile Decoder module 2130. The Tile Decoder module 2130 decodes entropy-encoded edges and prepares the batch fillmap tiles for merging. In an alternative implementation, where input fillmap tiles comprise pixel-aligned edges that are not entropy-encoded, Tile Decoder module 2130 can be omitted. The set of edges that make up each batch fillmap tile is then processed by a Scanline processor 2140 to produce spans of fill compositing sequences where each fill compositing sequence is described by the batch fillmap fill compositing sequences that contribute to that span. The fill compositing sequences produced by the Scanline Processor 2140 are merged by a Merger and Flattener Processor 2150, and flattened into a bitmap tile encapsulated in a fillmap. The bitmap tile is passed to a Tile Encoder module 2160 which entropy encodes the associated tile edges. In embodiment specific implementation, the Tile Encoder module 2160 also includes an image compressor that employs a hybrid compression method to further reduce the bitmap storage. The hybrid compression uses a combination of lossless and lossy approaches to efficiently reduce bitmap data size while maximizing the quality. In an alternative implementation that does not entropy encode edges or compress bitmap, the Tile Encoder module 2160 can be omitted. The encoded merged fillmap tiles are collated by a Tile aggregator 2170 into a merged fillmap region, which is sent to the Spool Store 460 via the bus 275.

Figure 22:
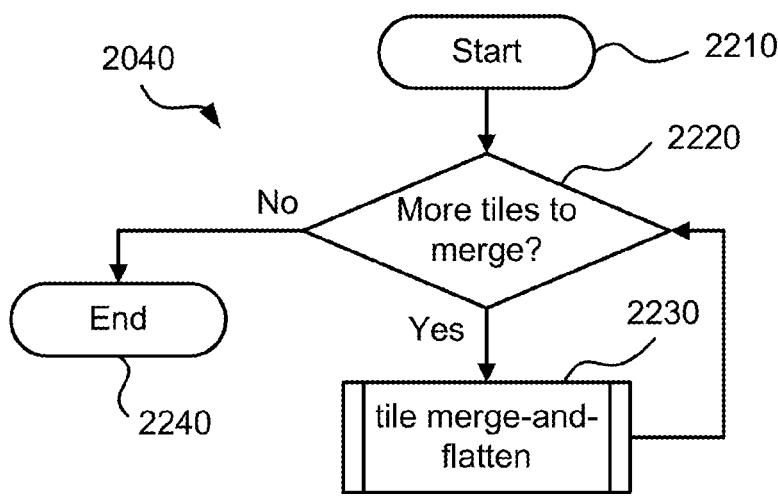
FIG. 22 is a schematic process flow diagram of the process of fillmap region merge-and-flatten 2040 of FIG. 20.

The high level fillmap region merge-and-flatten process at step 2040 will now be described with respect to FIG. 22. The process 2040 starts at step 2210 and proceeds directly to step 2220 where the Tile Disaggregator 2110 determines whether there are more tiles that require merge-and-flatten within the region. If no more tiles that require merge-and-flatten, then process 2040 exits via step 2240. If there are more tiles that require merge-and-flatten at step 2220, then the next tile from each batch fillmap is identified and these tiles are merged and flattened into a single bitmap tile in step 2230, which is carried out in Tile Decoder 2130, Scanline Processor 2140, Merger and Flattener Processor 2150, Tile Encoder 2160 and Tile Aggregator 2170 modules. Step 2230 then returns to step 2220.

Figure 23:
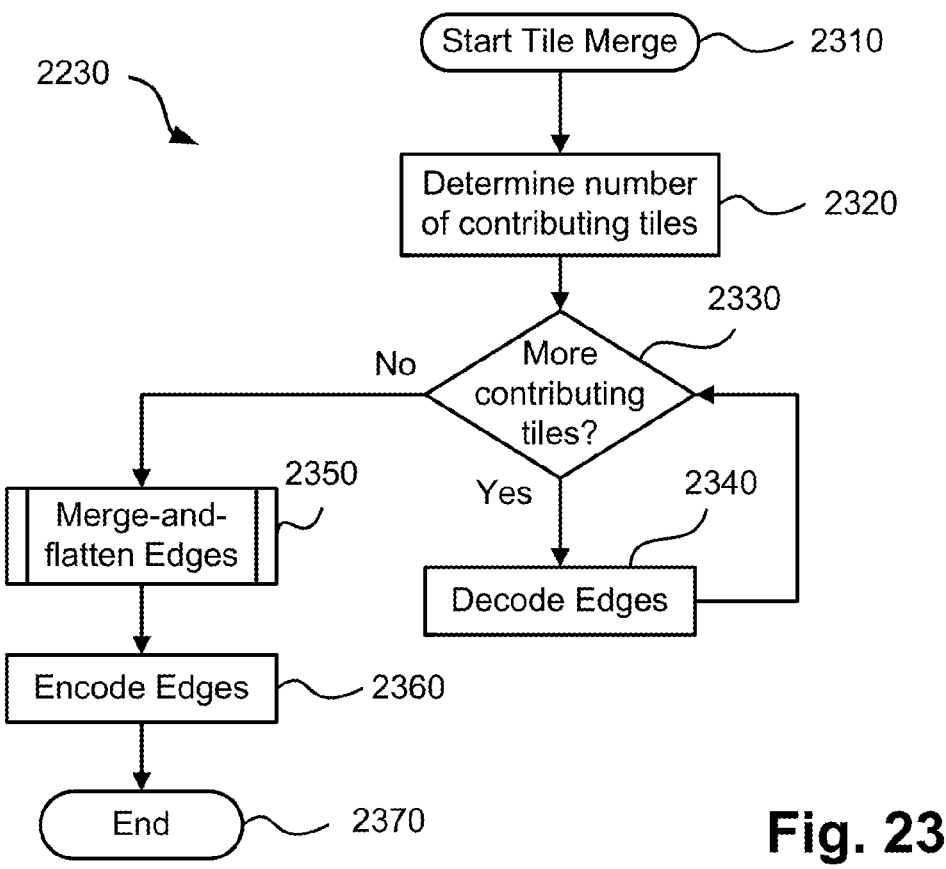
FIG. 23 is a detailed schematic flow diagram of the process of fillmap tile merge-and-flatten 2230 of FIG. 22.

The fillmap tile merge process 2230 will now be described in more detail with respect to FIG. 23. The process 2230 begins at step 2310 where the Tile Disaggregator 2110 receives each batch fillmap tile needed to generate the merged fillmap tile and passes them to step 2320. The number of contributing batch fillmap tiles is determined at step 2320. A batch tile is considered to contribute to the merged tile if all batch fillmap tiles above the batch tile in Z-order are not fully opaque and the batch tile contains at least one edge whose fill compositing sequence uses a fill that is not the background. A batch fillmap tile is considered to be fully opaque if all of the fill compositing sequences that describe regions within the tile do not require the background for compositing. Step 2330 controls a loop that iterates through each contributing tiles determined in step 2320. Step 2330 determines whether there are more contributing tiles from which to decode edges. If there are, then the process 2230 proceeds to step 2340, which decodes the entropy encoded fillmap edges in a tile. The decoding process is carried out by the Tile Decoder module 2130. Step 2340 then returns to step 2330. If no more contributing tiles need to be decoded, then step 2350 is carried out to merge and flatten batch fillmap edges from the contributing tiles. Step 2350 is executed by the Scanline Processor 2140 and the Merger and Flattener Processor 2150. At step 2360, the resultant bitmap tile edges from step 2350 are entropy encoded by the Tile Encoder 2160. In the preferred implementation, step 2360 also compresses the bitmap data using a hybrid compression method. The encoded merged fillmap tile is then output at step 2370 to be aggregated into the merged fillmap region by the Tile Aggregator 2170.

Figure 24:
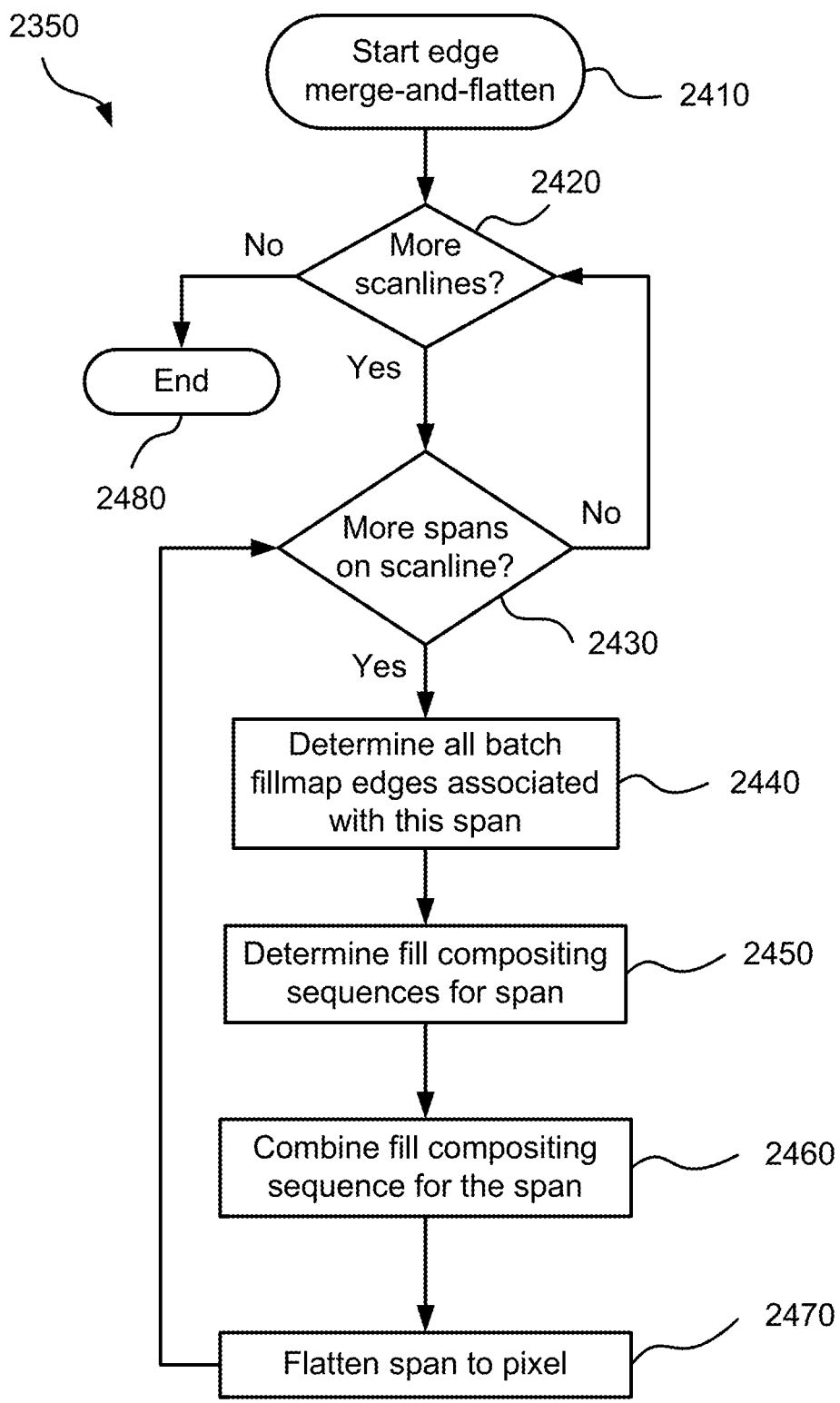
FIG. 24 is a detailed schematic flow diagram of the process of fillmap edge merge-and-flatten 2350 used in the method of FIG. 23.

FIG. 24 shows the process of merging and flattening edges 2350 in more detail. The process 2350 starts by receiving decoded edges from batch fillmap tiles that contribute to the merged fillmap tile at step 2410. Step 2420 is then executed to iterate through each scanline of the merged tile by checking whether there are more scanlines to be processed. If there are no more scanlines to be processed, process 2350 exits via step 2480. However, when more scanlines need to be processed, then process 2350 proceeds to step 2430 to iterate through each span on the next scanline. A span refers to the one or more adjacent pixels between two neighbouring edges crossing at different x-positions along the same scanline. Edges from contributing batch fillmaps tiles are combined to identify spans to be processed at step 2430. Hence, in the merged fillmap tile, a span can be the result of two edges coming from the same batch fillmap or coming from different batch fillmaps. If there are no more spans to be processed, then execution returns to step 2420. Where there are more spans to be processed, execution proceeds to step 2440 where all batch fillmap edges associated with the current span are determined. In the preferred implementation, this determination is done by reading edges from a single queue of sorted batch fillmap edges, known as "merge-queue". The merge-queue is created prior to processing the current scanline and keeps a list of edges from all the contributing fillmaps that intersect with the current scanline. The edges in the merge-queue are sorted in ascending x order. A batch fillmap edge is associated with a span if it crosses the current scanline at the same x-position as the starting x-position or the ending x-position of the current span. In an alternate implementation, the edges may be determined by reading edges in ascending x-order from a multiple of queues, each associated with a contributing batch fillmap. Each queue keeps a list of edges that belong to the associated batch fillmap and intersect with the current scanline. The edges in each queue are sorted in ascending x-order. After all batch fillmap edges associated with the current span have been determined, step 2450 is executed to determine all fill compositing sequences for the current span. Step 2450 is carried out by determining the fill compositing sequence referenced by each associated contributing batch fillmap edge. Process 2350 then proceeds to determine the fill compositing sequence of the current span by combining or "stacking" the batch fillmap compositing sequences associated with the current span according to their Z-order, at step 2460. This is done by passing the span, the fill compositing sequences associated with the span, and all batch fillmap edges associated with the span to the Merger and Flattener Generator module 2150. Step 2470 then converts, or flattens, the span into a pixel representation based on the combined fillmap compositing sequence. This involves rasterising data associated with spans of pixels associated with at least two layers of the image described by the fillmaps and results in the production and storage of at least a partially rasterised output of the merge-and-flatten process. The layers are typically adjacent layers in z-order. Once the span is flattened, step 2470 returns to step 2430.

Figure 25:
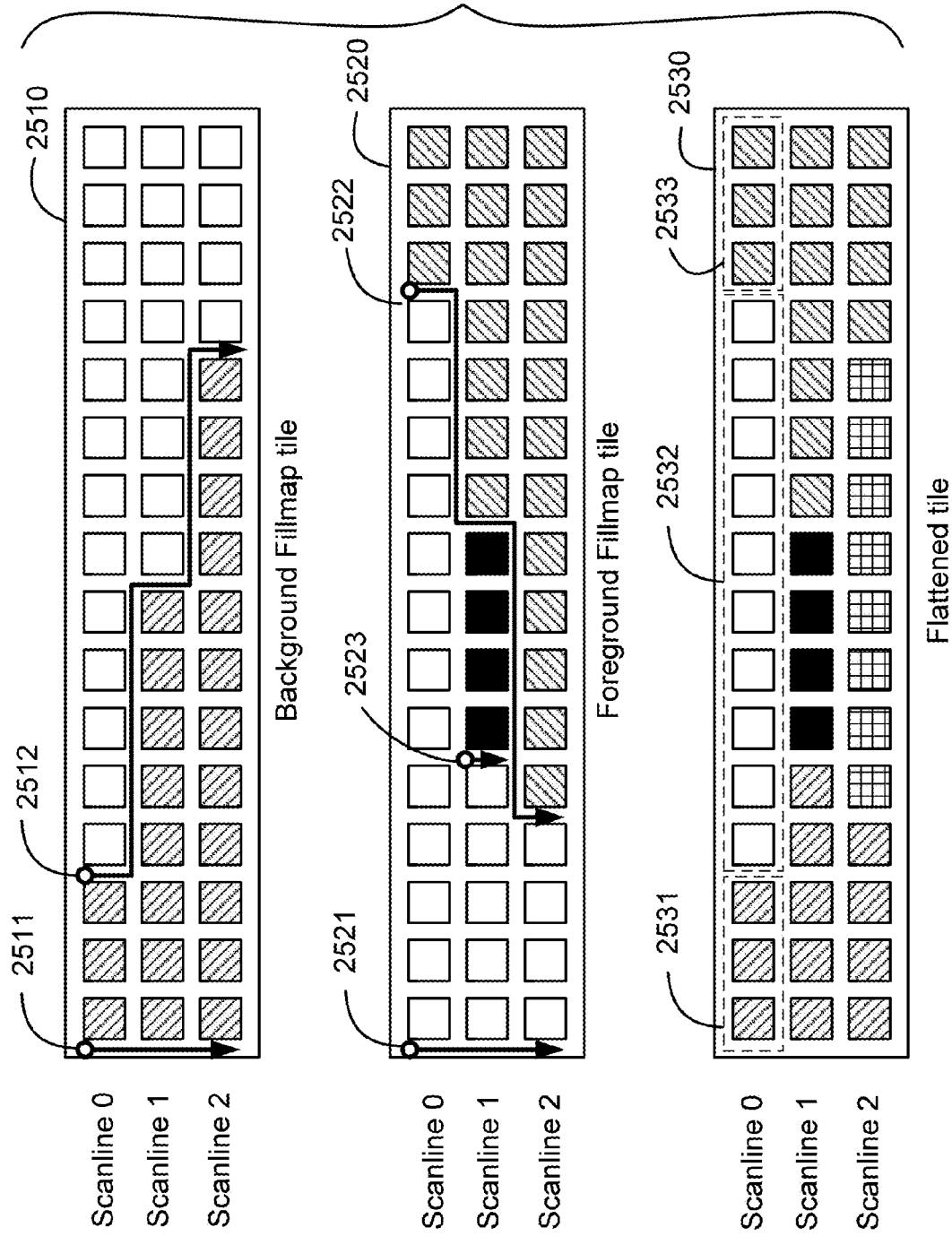
FIG. 25 is an example of a fillmap tile merge-and-flatten.

An example of merging two batch fillmap tiles as in step 2230 will now be described with respect to FIG. 25. The example shows the first three scanlines of two accumulated fillmap tiles 2510 and 2520 to be merged and flattened into a bitmap tile 2530. As seen in FIG. 25, each scanline is divided into a respective set of one or more contiguous source spans. Each source span is associated with an edge. If an edge is on the same scanline as a span, the span commences with the edge (commencing edge). Sometimes, an edge may extend across multiple scanlines. Such an edge is referred to as a "multiline edge". For example, the background (lower Z-level) accumulated fillmap 2510 contains two edges—edges 2511 and 2512—in its first three scanlines. The foreground (higher Z-level) accumulated fillmap 2520 contains three edges—edges 2521, 2522 and 2523—in its first three scanlines. Edges 2521 and 2522 are associated with fill compositing sequences that need to be composited with a background representation for rendering. The fill compositing sequence associated with edge 2523 is fully opaque and does not need a background for compositing and rendering.

Desirably, each accumulated fillmap is referenced by a fillmap pointer. The fillmap pointers are stored in a buffer managed by the processor 270, which is allocated based on the number of accumulated batch fillmaps being processed by the fillmap merge-and-flatten. The fillmap pointers are sorted according to the z-order of the accumulated batch fillmaps. For example, the first fillmap pointer in the buffer points to the bottom batch fillmap while the last fillmap pointer points to the top batch fillmap.

As explained above, the spans of the accumulated fillmaps are merged by combining the fill compositing sequences of the respective one or more source spans correspondingly positioned in the respective source scanlines. The resultant span is also referred to as the merged span.

Starting at scanline 0, the first merged span is started by edge 2511 and edge 2521, and ended by edge 2512. The fill compositing sequence of the first merged span is the combination of fill compositing sequences of the edges 2521 and 2511 respectively. Similarly, the second merged span is started by edge 2512 and ended by edge 2522. The second merged span has the combined fill sequence of edge 2512 and edge 2521. The third merged span is started by edge 2522 and extends to the end of scanline 0. The third merged span has the combined fill sequence of edge 2512 and edge 2522.

On scanline 1, the first merged span is started by edge 2511 and edge 2521, and ended by edge 2523. The first merged span has the combined fill sequence of edge 2521 and edge 2511. The second merged span is started by edge 2523 and ended by edge 2512. Since fill compositing sequence associated with edge 2523 is opaque, it does not need a background fill for compositing. Thus, the second merged span has only the fill sequence of edge 2523. The third merged span is started by edge 2512 and ended by edge 2522. Similar to the second merged span, the third merged span has only the fill sequence of edge 2523. The fourth merged span is started by edge 2522 and extended to the end of scanline 1. The fourth merged span has the combined fill sequence of edge 2512 and edge 2522.

On scanline 2, the first merged span is started by edge 2511 and edge 2521, and ended by edge 2522. The first merged span has the combined fill sequence of edge 2521 and edge 2511. The second merged span is started by edge 2522 and ended by edge 2512. The second merged span has the combined fill sequence of edge 2511 and edge 2522. The third merged span is started by edge 2512 and extended to the end of scanline 2. The third merged span has the combined fill sequence of edge 2512 and edge 2522.

As each merged span is created, the corresponding combined fill compositing sequence is flattened into a pixel representation, also referred to as a "pixel span". For example, on scanline 0, the first merged span is flattened into pixel span 2531, the second merged span is flattened into pixel span 2532 and the third pixel span is flattened into 2533. The flattening processing performs compositing operations to combine colours of the fills in the fill compositing sequence. An example of such compositing operations is the Porter and Duff compositing operations. A Porter and Duff compositing operation defines rules for combining two colours according to their corresponding transparency level. The output of the compositing operation is stored in a pre-allocated intermediate buffer, which is then used to composite with the colours of a next fill in the fill compositing sequence. All the flattened merged spans are stored in a pre-allocated buffer 2530 corresponding to a bitmap tile.

Figure 26:
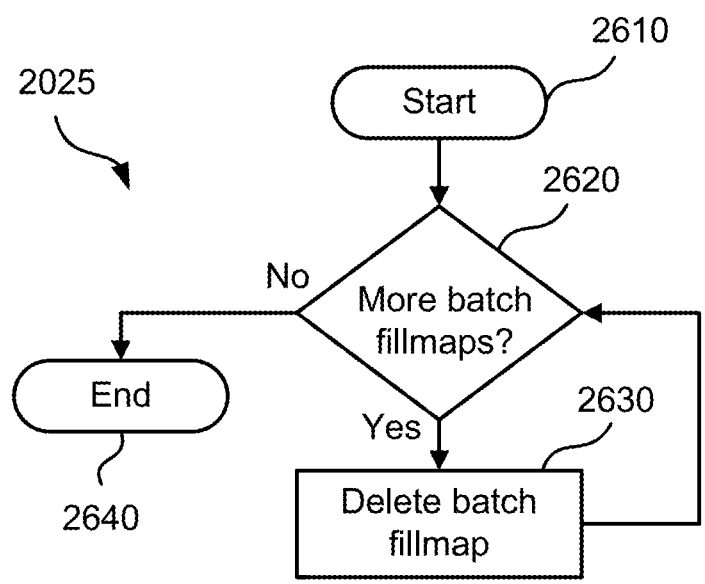
FIG. 26 is a schematic flow diagram of the batch fillmap clean-up process 2025 after fillmap merging as used in FIG. 20.

The process 2025 of batch fillmap clean-up will now be described with respect to FIG. 26. The clean-up process starts with step 2610 where the batch fillmaps that have been merged are passed in. The following step 2620 then decides whether there are more batch fillmaps to be processed. If no more batch fillmaps need to be cleaned up, then process 2025 exits via step 2640. Otherwise, process 2025 proceeds to step 2630 where the batch fillmap is deleted to free up storage. Process 2025 then returns to step 2620.

INDUSTRIAL APPLICABILITY

The arrangements described are applicable to the computer and data processing industries and particularly for the operation of printer and like devices having a limited amount of memory with which to process image or document data to be reproduced.

The foregoing describes only some embodiments of the present invention, and modifications and/or changes can be made thereto without departing from the scope and spirit of the invention, the embodiments being illustrative and not restrictive. For example, an electronic apparatus, an executable computer program and a computer program product, comprising computer readable medium having a computer program recorded therein, which are configured to perform the proposed method are also within the scope of the invention.

We claim:

1. A method for processing a plurality of objects arranged in z-bands in accordance with corresponding z-order said method comprising:
receiving at least a background graphical representation and a foreground graphical representation in an intermediate format, the received graphical representations corresponding to objects in a first z-band and objects in a second z-band, respectively;
estimating memory required to combine the received graphical representations using a first combining operation, wherein the first combining operation generates a bitmap for merged portions of the received graphical representations;
attempting, where the estimated memory exceeds a predetermined threshold, to combine the received graphical representations using a second combining operation to output an emerged graphical representation in the intermediate format; and
combining, where the attempt is unsuccessful, the received graphical representations in accordance with the first combining operation to produce a bitmap for merged portions of the received graphical representations.

2. A method according to claim 1 wherein first combining operation comprises merging and flattening at least two of the received graphical representations to produce rasterised data and the second combining operation comprises merging at least two of the received graphical representations to produce an output in the intermediate format.

3. A method according to claim 1 wherein the intermediate format comprises a fillmap.

4. A method according to claim 1 wherein the estimating is based upon a structure of the intermediate format and a content of at least one of the received graphical representations in the intermediate format.

5. A method according to claim 4 wherein the content includes attributes of the graphical representations, the attributes including at least one of number of edges and fill type.

6. A method according to claim 1 wherein the estimating is dependent on resources required to produce and store at least a bitmap for merged portions of the received graphical representations.

7. A method according to claim 1 comprising combining the layers in accordance with the second combining operation, when the estimation of resources required to perform first combining operation is above a predetermined threshold.

8. A method according to claim 1, further comprising:
determining, using the estimate, a display list associated with the received layers, and selecting portions of the image associated with determined display list to be merged.

9. A method according to claim 8, wherein the generating further comprises:
generating a combined layer for the selected portions by combining data from the received layers corresponding to the selected portions in accordance with the second combining operations if the attempt succeeds, and in accordance with the first combining operation otherwise.

10. A method for processing a plurality of objects arranged in z-bands in accordance with corresponding z-order, said method comprising:
receiving a plurality of layers of intermediate image data in an intermediate format until memory resources required during combining the received layers of intermediate image data using a first combining operation exceed a predetermined threshold, wherein the first combining operation generates a bitmap for merged portions of the received layers of intermediate image data, each layer of intermediate image data corresponds to objects in an associated z-band converted to the intermediate format;
in response to exceeding the predetermined threshold, combining the received layers of intermediate image data using a second combining operation to produce an output in the intermediate format; and
where the combining using the second combining operation is unsuccessful, combining the received layers of intermediate image data in accordance with the first combining operation.

11. A method according to claim 10, wherein the first combining operation rasterises a portion of the received layers before merging at least one other portion of the received layers of intermediate image data and the resources associated with the first combining operation comprise memory for storing the rasterised output of the first combining operation.

12. A method for combining a plurality of layers associated with an image, each of the layers being represented using an intermediate format, said method comprising:
(a) receiving two layers from the plurality of layers to be combined, each of the layers corresponding to a plurality of objects in an associated z-band converted to the intermediate format;
(b) estimating memory required to combine the received layers using a first combining operation, wherein the first combining operation generates a bitmap for merged portions of the received layers of intermediate image data;
(c) where the estimated memory is sufficient for the first combining operation, attempting to combine the received layers using a second combining operation to produce an output in the intermediate format;
(d) where the attempt to combine the received layers using the second combining operation is successful, using the output as the result of the method, and
(e) where the attempt to combine the received layers using the second combining operation is unsuccessful, generating a combined layer for the image by combining the received layers in accordance with the first combining operation.

13. A method according to claim 12 wherein the two layers are adjacent in z-order fillmaps and are combined to form a combined layer, and the method further comprises repeating steps (a) to (e) using the combined layer as one of the two received layers until all fillmaps associated with the image have been combined.

14. A non-transitory computer readable storage media having a program recorded thereon, the program being executable by a processor to process a plurality of objects arranged in z-bands in accordance with corresponding z-order, said program comprising:
   code for receiving at least a background graphical representation and a foreground graphical representation in an intermediate format, the received graphical representations corresponding to objects in a first z-band and objects in a second z-bands, respectively;
   code for estimating memory required to combine the received graphical representations using a first combining operation, wherein the first combining operation generates a bitmap for merged portions of the received graphical representations;
   code for attempting, where the estimated memory exceeds a predetermined threshold, to combine the received graphical representations using a second combining operation to output a merged graphical representation in the intermediate format; and
   code for combining, where the attempting is unsuccessful, the received graphical representations in accordance with the first combining operation.

15. A non-transitory computer readable storage media according to claim 14 wherein the intermediate format comprises a fillmap, the first combining operation comprises merging and flattening at least two of the received graphical representations and the second combining operation comprises merging at least two of the received graphical representations.

16. A non-transitory computer readable storage media according to claim 14 wherein the estimating is based upon a structure of the intermediate format and a content of at least one of the received graphical representations in the intermediate format, wherein the content includes attributes of the graphical representations selected including at least one of number of edges and fill type.

17. A non-transitory computer readable storage media according to claim 14 wherein the estimating is dependent on resources required to produce and store at least a bitmap for merged portions of the received graphical representations, the program further comprising code for combining the layers in accordance with the second combining operation, when the estimation of resources required to perform first combining operation is above a predetermined threshold.

18. A non-transitory computer readable storage media according to claim 14, further comprising:
   code for determining, using the estimate, a display list associated with the received layers, and selecting portions of the image associated with determined display list to be merged; and
   wherein the code for generating further comprises: code for generating a combined layer for the selected portions by combining data from the received layers corresponding to the selected portions in accordance with the second combining operations if the attempt succeeds, and in accordance with the first combining operation otherwise.

19. An apparatus for processing a plurality of objects arranged in z-bands in accordance with corresponding z-order, the apparatus comprising:
   a receiver to receive a background graphical representations and a foreground graphical representation in an intermediate format, the received graphical representations corresponding to objects in a first z-band and objects in a second z-band respectively;
   a memory estimator to estimate memory required to combine the received graphical representations using a first combining operation, wherein the first combining operation generates a bitmap for merged portions of the received graphical representations;
   a combining operation selector to select one of the first combining operation and a second combining operation based on success of an attempt to combine the received layers using the second combining operation to output a merged graphical representation in the intermediate format, the selector being triggered where the estimated memory exceeds a predetermined threshold required to combine the received graphical representations using the first combining operation; and
   a combined layer generator to combine the received layers of the image in accordance with the selected combining operation by the selector.

20. An image printing system comprising:
   computer apparatus operable to create a page to be printed; and
   printer apparatus coupled to the computer apparatus, the printer apparatus comprising an apparatus for processing a plurality of objects arranged in z-bands in accordance with corresponding z-order, the apparatus comprising:
   a receiver to receive a background graphical representation and a foreground graphical representation in an intermediate format, the received graphical representations corresponding to objects in a first z-band and objects in a second z-band, respectively;
   a resource estimator to estimate resources required to combine the received graphical representations using a first combining operation, the resources comprising at least memory of the printer apparatus available for rendering the intermediate format to a hard copy medium, wherein the first combining operation generates a bitmap for merged portions of the received graphical representations;
   a combining operation selector to select one of the first combining operation and a second combining operation based on success of an attempt to combine the received layers using the second combining operation to output a merged graphical representation in the intermediate format, the selector being triggered where the estimated memory exceeds a predetermined threshold using the first combining operation; and
   a combined layer generator to combine the received layers of the image in accordance with the selected combining operation by the selector.

21. A method for processing a plurality of objects arranged in z-bands in accordance with corresponding z-order, said method comprising:
   (a) receiving a background graphical representation in an intermediate format corresponding to objects in a first z-band;
   (b) receiving a foreground graphical representation in the intermediate format corresponding to objects in a second z-band;
   (c) estimating memory resources required for combining the received graphical representations using a first combining operation, wherein the first combining operation merges corresponding portions of the received graphical representations to a merged portion in the intermediate format with subsequent generation of a bitmap for the merged portion before merging at least one further set of corresponding portions of the received graphical representations;

(d) if the estimated memory resources exceed a predetermined threshold, combining the received graphical representations using a second combing operation to produce a merged graphical representation in the intermediate format;

(e) where the combining using the second combining operation is unsuccessful, generating a bitmap by combining the received graphical representations in accordance with the first combining operation; and (f) if the estimated memory resources required for combining the received graphical representation using the first combining operation are below the predetermined threshold, receiving a further graphical representation in the intermediate format to be combined with the background and foreground graphical representations, where the further graphical representation corresponds to objects in a third z-band.

\* \* \* \* \*